(12) United States Patent
Kwok et al.

(10) Patent No.: US 8,358,391 B2
(45) Date of Patent: Jan. 22, 2013

(54) METHOD TO OBTAIN A CONTROLLED PRETILT AND AZIMUTHAL ANGLES IN A LIQUID CRYSTAL CELL

(75) Inventors: Hoi Sing Kwok, Hong Kong (CN); Yuet Wing Li, Hong Kong (CN); Chung Yung Lee, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 687 days.

(21) Appl. No.: 12/436,575

(22) Filed: May 6, 2009

(65) Prior Publication Data

US 2009/0279032 A1  Nov. 12, 2009

Related U.S. Application Data

(60) Provisional application No. 61/071,567, filed on May 6, 2008.

(51) Int. Cl.
*G02F 1/1337* (2006.01)
(52) U.S. Cl. .......................... 349/129; 349/125; 349/124
(58) Field of Classification Search .................. None
See application file for complete search history.

(56) References Cited

U.S. PATENT DOCUMENTS

| 6,081,313 | A  | * | 6/2000  | Kim ............................ 349/129 |
| 6,582,776 | B2 |   | 6/2003  | Yip et al. |
| 2004/0246421 | A1 | * | 12/2004 | Inoue et al. ................... 349/129 |
| 2005/0260426 | A1 |   | 11/2005 | Kwok et al. |
| 2006/0290856 | A1 | * | 12/2006 | Lim .............................. 349/125 |
| 2007/0154657 | A1 | * | 7/2007  | Sha et al. ........................ 428/1.6 |
| 2009/0027603 | A1 | * | 1/2009  | Samulski et al. ............. 349/124 |
| 2009/0268142 | A1 | * | 10/2009 | Fu et al. ........................ 349/128 |
| 2011/0199566 | A1 | * | 8/2011  | Mazusaki et al. ............. 349/123 |

FOREIGN PATENT DOCUMENTS

| CN | 1356585 A   | 7/2002 |
| CN | 101004495 A | 7/2007 |

OTHER PUBLICATIONS

Janning, "Thin film surface orientation for liquid crystals," *Appl. Phys Lett.*, 21, 173-174 (1972).
Kim et al., "Tristable nematic liquid-crystal device using micropatterned surface alignment," *Nature*, 420, 159-162 (Nov. 14, 2002).
Lee et al., "Continuous liquid crystal pretilt control through textured substrates," *Appl. Phys. Lett.*, 85: 23, 5556-5558 (Dec. 6, 2004).
Lee et al., "Alignment of liquid crystals with patterned isotropic surfaces," *Science*, 291, 2576-2580 (Mar. 30, 2001).
Mauri et al., "Spinodal decomposition in binary mixtures," *Phys. Rev. E*, 53: 3, 2613-2623 (Mar. 1996).

(Continued)

*Primary Examiner* — Hemang Sanghavi
(74) *Attorney, Agent, or Firm* — Leydig, Voit & Mayer, Ltd.

(57) ABSTRACT

We disclose a new method of preparing liquid crystal alignment layers that can produce controllable pretilt angles from near 0 to near 90°. It is based on the stacking of two alignment materials sequentially, with the first one being continuous and the second one being discontinuous leaving part of the first layer exposed.

24 Claims, 38 Drawing Sheets

OTHER PUBLICATIONS

Rolic Technologies Ltd., "Linearly photo-polymerisable polymer (LPP) as alignment layer for liquid crystals and retardation film coatings," *Technical Data Sheet ROLIC® ROP-103*, 1-7 (Sep. 19, 2006).

Tsui et al., "First-order liquid crystal orientation transition on inhomogeneous substrates," *Phys. Rev. E*, 69, 021704-1-0217074-7 (Feb. 24, 2004).

Wan et al., "Liquid crystal pretilt control by inhomogeneous surfaces," *Phys. Rev. E*, 72, 021711-1-021711-4 (Aug. 30, 2005).

Wang et al., "A new effective model for the director distribution of a twisted nematic liquid crystal cell," *J. Opt. A: Pure Appl. Opt.*, 7, 438-444 (Jul. 15, 2005).

Yaroshchuk et al., "Planar and tilted uniform alignment of liquid crystals by plasma-treated substrates," *Liquid Crystals*, 31: 6, 859-869 (Jun. 1, 2004).

Yeung et al., "Fast-response no-bias-bend liquid crystal displays using nanostructured surfaces," *Appl. Phys. Lett.*, 88, 065305-1-065305-3 (Feb. 7, 2006).

Zhang et al., "Controlling liquid crystal pretilt using a novel double layer alignment film," *Kent State University Liquid Crystal Day*, Abstract 10:25:11 (Kent, Ohio, USA, Sep. 2, 2008).

Zhao et al., "Weak boundary anchoring, twisted nematic effect, and homeotropic to twisted-planar transition," *Phys. Rev. E*, 65, 031709-1-031709-11 (Feb. 13, 2002).

State Intellectual Property Office of the People's Republic of China, Examination Report in Chinese Patent Application No. 200910140401.6 (Dec. 9, 2010).

* cited by examiner (a) z/L=0.0

(b) z/L=0.23

(c) z/L=0.46

(d) z/L=1.0

METHOD TO OBTAIN A CONTROLLED PRETILT AND AZIMUTHAL ANGLES IN A LIQUID CRYSTAL CELL

CROSS-REFERENCE TO RELATED APPLICATIONS

This patent application claims the benefit of U.S. Provisional Patent Application No. 61/071,567, filed May 6, 2008, which is herein incorporated by reference in its entirety.

FIELD OF THE INVENTION

This invention is generally related to liquid crystal cells and, more particularly, to the generation of arbitrarily controlled pretilt angles and azimuthal angles in liquid crystal cells.

BACKGROUND OF THE INVENTION

There is a constant need for precisely controlled pretilt angles in a liquid crystal cell. Sometimes the pretilt angles needed for certain applications can be quite large and are difficult to reliably obtain using conventional alignment techniques.

U.S. Patent Application Publication No. 2005/0260426 to Kwok teaches a technique for generating a large controllable pretilt angle using inhomogeneous alignment surfaces. Instead of being uniform and composed of a single material, the alignment surface includes nano and micro-scale domains of different alignment materials. In particular, if the alignment materials are such that one kind is capable of generating a vertical alignment and the other kind is capable of generating a homogeneous or horizontal alignment, then the resultant surface generates an intermediate pretilt angle.

Kwok's published application applies random phase segregation upon drying of a binary mixture of different alignment materials. The distribution of domains is random, sometimes not uniform, and is difficult to control. Therefore, it is desired to fabricate an inhomogeneous alignment surface that is highly controllable and to generate a uniform alignment layer for large substrates.

SUMMARY OF THE INVENTION

Described herein is a method for fabricating an inhomogeneous alignment layer that is highly controllable in a liquid crystal cell. A very uniform alignment layer is obtained for a large substrate that is useful for many display applications.

According to one embodiment, a liquid crystal alignment layer is provided in a liquid crystal cells having at least one liquid crystal material. The liquid crystal alignment layer includes a substrate and first and second alignment layers. The first alignment layer is continuously disposed on the substrate for inducing a first liquid crystal pretilt angle and a first azimuth angle in the liquid crystal material. The second alignment layer is continuously or discontinuously disposed on a surface of the first alignment layer. The second alignment layer independently induces a second liquid crystal pretilt angle and a second azimuth angle in the liquid crystal material.

According to a further embodiment, the second alignment layer includes a plurality of island structures. Alternatively, the second alignment layer includes one or more network structures. Still alternatively, the second alignment layer includes "hills" and "valleys" structures. A height difference between the "hills" and "valleys" structures ranges from 1 nm to 200 nm.

According to another embodiment, a method is provided for producing a liquid crystal alignment layer in a liquid crystal cells including at least one liquid crystal material. The method includes (1) disposing continuously a first alignment layer on a substrate, (2) treating the first alignment layer for inducing a first pretilt angle and a first azimuthal angle in the liquid crystal material, (3) disposing discontinuously a second alignment layer on a surface of the first alignment layer, and (4) treating the second alignment layer for inducing a second pretilt angle and a second azimuthal angle in the liquid crystal material.

PREFERRED EMBODIMENTS OF THE PRESENT INVENTION

Studies of inhomogeneous surfaces for liquid crystal (LC) alignments have witnessed a rapid growth in recent years. This is because such an alignment arrangement is capable of generating high pretilt angles in a liquid crystal cell. Several experiments have shown that a high pretilt angle can be applied to different applications such as bistable display devices and the No Bias Bend fast switching LC mode. These alignment surfaces generally comprise two kinds of domains favoring different LC orientations. The arrangement of those surfaces can be in alternating stripped or checkerboard patterns.

Figure 1:
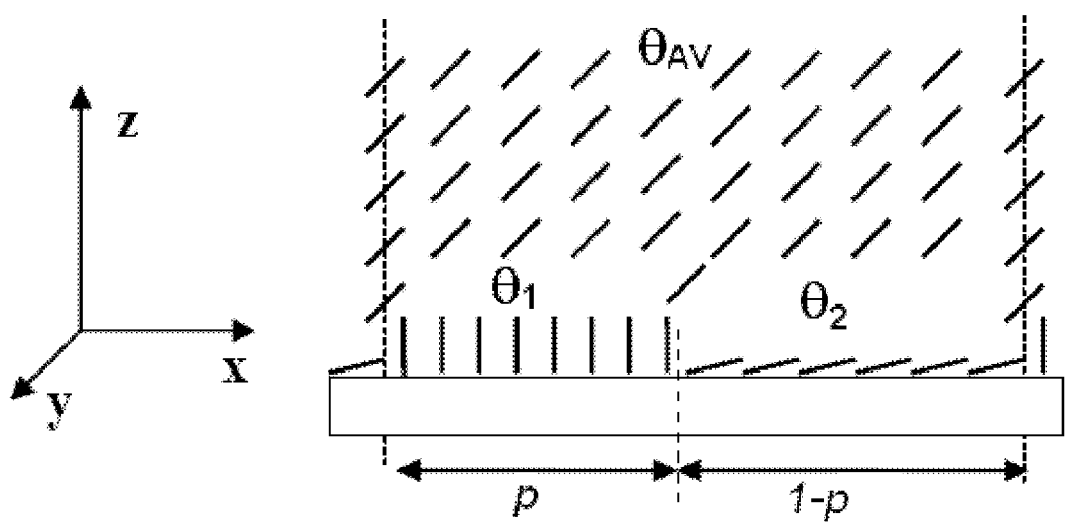
FIG. 1 illustrates a modeling scheme of an inhomogeneous alignment surface.

In Jones T. K. Wan, Ophelia K. C. Tsui, Hoi-Sing Kwok, Ping Sheng, "Liquid Crystal Pretilt Control by Inhomogeneous Surfaces," *Phys. Rev. E* 72, 021711-1-021711-4 (2005), a regular patchy pattern is described having a finite anchoring energy. The modeling scheme is shown in FIG. 1. The surface energy, $F_s$, is similar to the Rapini-Papoular form of the liquid crystal surface energy:

$$F_S = \sum_{i=0}^{N} \frac{w_i}{2} W_i \sin^2(\theta_{AV}(0) - \theta_{0i}), \tag{1}$$

where the total weight $$\sum_{i=0}^{N} w_i = 1,$$

Figure 2:
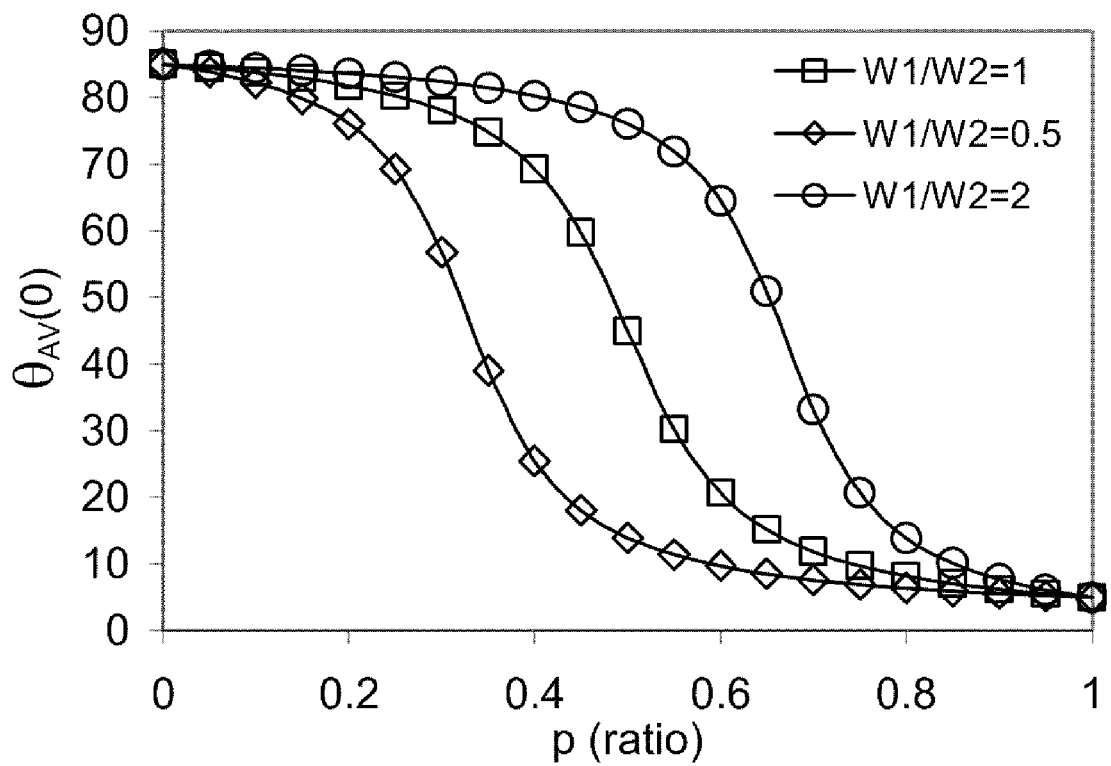
FIG. 2 illustrates the simulation results of the average pretilt angle $\theta_{AV}$ versus the area ratio p.

$\theta_{AV}(0)$ is the average tilt angle at the surface z=0, $\theta_{0i}$ is the alignment angle, and $W_i$ is the anchoring energy constant which ranges from $10^{-4}$ to $10^{-3}$ J/m$^2$. The total energy per unit area of an arbitrary configuration liquid crystal system can be described as:

$$\frac{U}{\lambda^2} = \frac{K_{11}}{\lambda} \left( \int_0^1 \int_0^1 \int_0^1 \tilde{F}_e(n) \, dx \, dy \, dz + \sum_{i=1}^{2} \int_0^1 \int_0^1 \frac{\lambda}{\ell_{ei}} f_i(x,y) \frac{\sin^2(\theta - \theta_{0i})}{2} \, dx \, dy \right), \tag{2}$$

where $\lambda$ is the pitch, $f_i(x, y) \in \{0,1\}$ is allocation function for domain i. n=(x,y,z) the LC director $\ell_{ei} = K_{11}/A_i$, and $\tilde{F}_e = F_e/K_{11}$. When the pitch $\lambda \to 0$ (i.e., $\lambda$ becomes very small), the system U must have its energy solely comes from the surface energy at z=0, such as U=$\Sigma F_{Si}$. It is assumed that there are only two domains with the zero fan angle alignment direction, such as $\phi_i$=0 and their pretilt angles and anchoring energy are $\theta_1$, $\theta_2$, $W_1$ and $W_2$ respectively. The pretilt angle is just the pretilt angle that minimizes the surface energy term of equation (2). It is straightforward to show that $\theta_{AV}(0)$ satisfies equation (3):

$$\frac{dF_S}{d\theta_{AV}} = 0 \tag{3}$$

$$\frac{1}{p} = 1 - \frac{W_1 \sin(2\theta_{AV} - 2\theta_1)}{W_2 \sin(2\theta_{AV} - 2\theta_2)}$$

$$\theta_{AV} = \theta_1 + \frac{1}{2} \tan^{-1}\left( \frac{(1-p)W_2 \sin 2(\theta_1 - \theta_2)}{(p-1)W_2 \cos 2(\theta_1 - \theta_2) - pW_1} \right),$$

where p is the normalized domain ratio. By substituting $\theta_1$=85° and $\theta_2$=5° into equation (3), the effect of different anchoring energy ratio for domain 1 and 2 is shown in FIG. 2.

According to equation (3), we can also investigate the effect of boundary angles $\theta_1$, $\theta_2$ on the $\theta_{AV}(0)$ under some very special case. Assuming $\theta_1 > \theta_2$ and $$\theta_1 = \frac{\pi}{2} - \Delta_1$$

and $\theta_2 = 0 + \Delta_2$, (3) gives $$\theta_{AV} = \frac{\pi}{2} - \Delta_1 + \frac{1}{2}\tan^{-1}\left(\frac{(1-p)W_2\sin 2\left(\frac{\pi}{2} - \Delta_1 - \Delta_2\right)}{(p-1)W_2\cos 2\left(\frac{\pi}{2} - \Delta_1 - \Delta_2\right) - pW_1}\right). \quad (4)$$

If $\Delta_1 + \Delta_2 = 0$, then $$\theta_{AV} = \frac{\pi}{2} - \Delta_1 + \frac{1}{2}\tan^{-1}(0) \quad (5)$$
$$\theta_{AV} = \frac{\pi}{2} - \Delta_1 = \theta_1.$$

Figure 3:
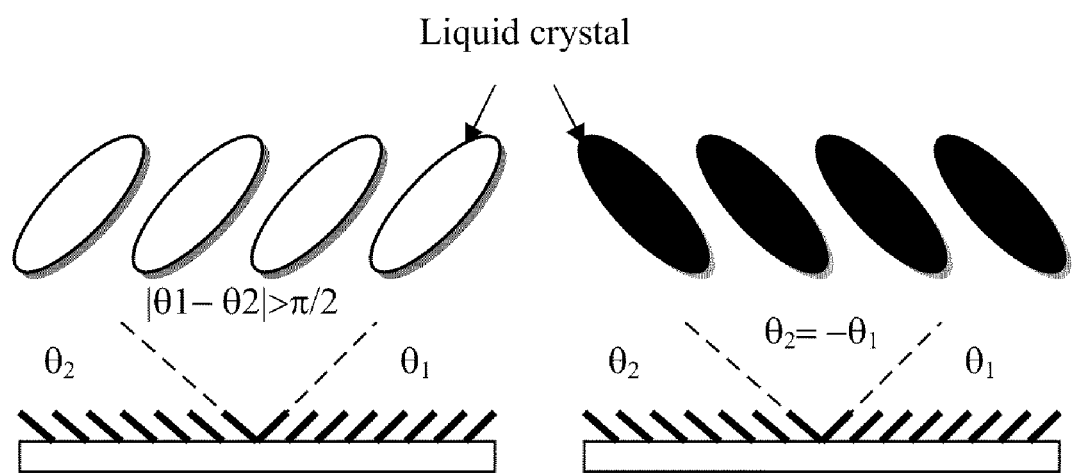
FIG. 3 illustrates the average pretilt $\theta_{AV}(0)$ uncertainty due to $\theta_1 = -\theta_2$, where the liquid crystal aligns at either $\theta_1$ (left) or $\theta_2$ (right)

Similarly, if we assume $\theta_1 = 0 + \Delta_1$ and $$\theta_2 = \frac{\pi}{2} - \Delta_2$$

and $\theta_1 < \theta_2$, the same results will follow. Therefore, if we have two alignment directions such that the angles difference $\geq \pi/2$ and $\Delta_1 + \Delta_2 = 0$, the resultant $\theta_{AV}(0)$ at any regions can be biased to either $\theta_1$ or $\theta_2$ as shown in FIG. 3. The exact orientation can be controlled by very small local perturbations. Such effects are very important to control the backflow flowing directions in the liquid crystal bulk.

The concept of $\theta_{AV}(0)$ is valid only if the domain size is infinitely small, that is, $\lambda \to 0$. Actually the effects of domain size on the average pretilt angles in the bulk system are the most important issue for high pretilt angle study. The detailed simulation model and results are described herein.

The modeling of average pretilt angles has no analytical solutions. Given the mathematical equations describing the free energy density, the objective is to minimize the energy of the device, so that the corresponding director distributions can be obtained.

According to one embodiment, an iterative method is provided, where the liquid crystal molecules relax to the equilibrium states, such as $n_{i,j} = 0$ $\forall i,j \in \{x,y,z\}$. The advantage of this method is that splay, bend transitions can be taken care of. No singularity will be found during the iterations. To further describe this method, the Lagrange equation is given as $$\left(\frac{\partial L}{\partial n_{i,j}}\right)_{,j} - \frac{\partial L}{\partial n_i} = 0 \quad (6)$$

where L is the Lagrangian function: $L = K - U$, K is the kinetic energy density, and U is the potential energy density. $n = (n_x, n_y, n_z)$. Since there is no kinetic energy in this configuration, $K = 0$. The potential energy is given in equation (7):

$$L = -U = -F_s + \frac{1}{2}\lambda(n_x^2 + n_y^2 + n_z^2) \quad (7)$$

$$F_s = \frac{1}{2}K_{11}(\nabla \cdot n)^2 + \frac{1}{2}K_{22}(n \cdot \nabla \times n)^2 + \frac{1}{2}K_{33}\|n \times \nabla \times n\|^2,$$

where $\lambda$ is a Lagrange multiplier to maintain the unit length of the director n, and $K_{ii}$ is Frank constants. When a Rayleigh dissipation function is added in, equation (6) becomes equation (8)

$$\left(\frac{\partial L}{\partial n_{i,j}}\right)_{,j} - \frac{\partial L}{\partial n_i} + \frac{\partial F_d}{\partial \dot{n}_i} = 0 \quad (8)$$

$$F_d = \frac{1}{2}\gamma_1(\dot{n}_x^2 + \dot{n}_y^2 + \dot{n}_z^2),$$

where each of the dots denotes a differentiation of the parameter with respect to time t and $\gamma_1$ is the rotational viscosity. Combining equations (6), (7), and (8) yields equation (9):

$$-\left(\frac{\partial F_s}{\partial n_{i,j}}\right)_{,j} + \frac{\partial F_s}{\partial n_i} - \lambda n_i + \gamma_1 \dot{n}_i = 0. \quad (9)$$

Equation (9) is rewritten as:

$$\gamma_1(\dot{n})_i = \left(\frac{\partial F_s}{\partial n_{i,j}}\right)_{,j} - \frac{\partial F_s}{\partial n_i} + \lambda n_i \quad (10)$$

$$\gamma_1 \dot{n}_i = [F_s]_{n_i} + \lambda n_i.$$

According to a further embodiment, if it is assumed that the Frank constants are all equal $\overline{K} = (K_{11} + K_{22} + K_{33})/3$, dimension along the y axis is 0 (in fact, a 2D simulation within the x-z plane is adequate), and the liquid crystal is untwisted, $F_e$ can be simplified to:

$$F_s = (n_{x,x} + n_{z,z})^2 + (n_{x,z} - n_{z,x})^2(n_z^2 + n_x^2) + (n_z n_{z,x} + n_x n_{x,y})^2. \quad (11)$$

Hence equation (10) can be rewritten as equations (12) and (13), $$\gamma_1 \dot{n}_x = \overline{K}[n_z(n_{x,z} - n_{z,x})^2 - (n_{x,x,x} + n_{z,x,z}) - \\ n_z^2(n_{x,z,z} - n_{z,x,z}) - n_x^2(n_{x,z,z} - n_{z,x,z})], + \lambda n_x \quad (12)$$

$$\gamma_1 \dot{n}_z = \overline{K}[n_z(n_{x,z} - n_{z,x})^2 - (n_{z,z,z} + n_{x,x,z}) + \\ n_z^2(n_{z,x,x} - n_{x,z,x}) + n_x^2(n_{x,x,z} - n_{z,x,x})], + \lambda n_z \quad (13)$$

From the equations show above, it can be appreciated that the Cartesian coordinate vector form is much simpler than the $\theta-\phi$ approach and it is much more directly correlated to the system geometry as described below. In addition, as the director approaches homeotropic (i.e., $\theta = 90°$), the azimuthal angle becomes undefined. This causes numerical difficulties, where the simulation program tries to decide which azimuthal angle minimizes the free energy $F_e$. Therefore, the $\theta-\phi$ approach is only used in selected one-dimensional (1D) simulations.

Equation (10) shows that the most fundamental problem is how to determine the derivative $n_{i,j}$. There are two common methods use to accomplish this: one is the finite element method (FEM), and the other is finite difference method (FDM). According to one embodiment, a finite element method is provided for determining the derivatives $n_{i,j}$, where it is assumed that the solution can be approximated by a linear combination of a finite collection of element function, $\delta_i$, that $$f(x) \approx \sum_{i=1}^{n} a_i \delta_i(x).$$

According to a further embodiment, the coefficients $a_i$ are determined by the specific version of the finite element method used in the computation.

Compared with the finite element method, the finite difference method is generally less complicated, and therefore provides a more desirable approach for determining the derivatives.

Figure 4:
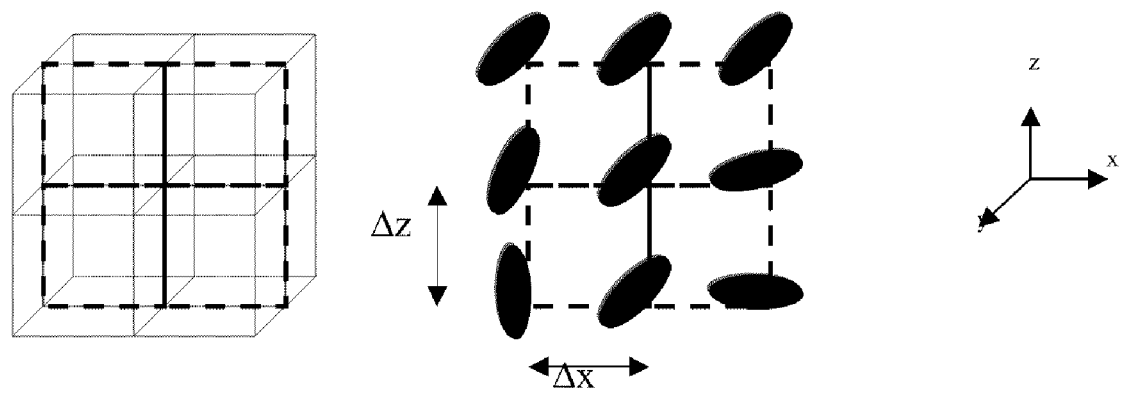
FIG. 4 illustrates grids for the finite difference method, where the liquid crystal molecules are assumed to be uniform within the grids and the grid size is $\Delta x \times \Delta y \times \Delta z$.

According to one embodiment, a finite difference method is provided, where the computational domain is separated into rectangular cubes (i.e., grids), as shown in FIG. 4, all having the same dimensions.

The derivatives are then estimated on these grids. To derive a formula that can be used to estimate the derivatives, the Taylor series expansion is used:

$$f(x + \Delta x) = f(x) + f'(x)\Delta x + \frac{f''(x)}{2}\Delta x^2 + \ldots, \quad (14)$$

$$f(x - \Delta x) = f(x) - f'(x)\Delta x + \frac{f''(x)}{2}\Delta x^2 - \ldots, \quad (15)$$

Solving for the first derivative $f'(x)$ in equation (14), the forward derivatives are obtained as:

$$f'(x) = \frac{f(x + \Delta x) - f(x)}{\Delta x} - \frac{f''(x)}{2}\Delta x + \ldots \quad (16)$$

$$f'(x) \approx \frac{f(x + \Delta x) - f(x)}{\Delta x}.$$

Similarly, the backward derivatives are obtained as:

$$f'(x) = \frac{f(x) - f(x - \Delta x)}{\Delta x} + \frac{f''(x)}{2}\Delta x + \ldots \quad (17)$$

$$f'(x) \approx \frac{f(x) - f(x - \Delta x)}{\Delta x}.$$

Rearranging equations (16) and (17) yields the centered difference formula, which becomes more accurate to second-order:

$$f'(x) = \frac{f(x + \Delta x) - f(x - \Delta x)}{2\Delta x} - \frac{f'''(x)}{6}\Delta x^2 + \ldots \quad (18)$$

$$f'(x) \approx \frac{f(x + \Delta x) - f(x - \Delta x)}{2\Delta x}.$$

For the second derivative $f''(x)$, equation (19) is given as:

$$f''(x) = \frac{f(x + \Delta x) + f(x - \Delta x) - 2f(x)}{\Delta x^2} - \frac{f''''(x)}{12}\Delta x^2 \quad (19)$$

$$f''(x) \approx \frac{f(x + \Delta x) + f(x - \Delta x) - 2f(x)}{\Delta x^2}.$$

Now, all the numerical derivatives have been derived for implementing a relaxation governed by equations (10). However, it is impossible to use equations (12) and (13) and to solve new directors $n_x$, $n_z$, and $\lambda$. Therefore, the $\lambda$ term is dropped and the directors are renormalized to the unit length after each iteration. Therefore equation (10) becomes $$\gamma_1 \frac{\Delta n_i}{\Delta t} = -[F_e]_{n_i}. \quad (20)$$

And the new director after each iteration is $$n_i^{new} = \frac{n_i^{old} - \frac{\Delta t}{\gamma_1}[F_e]_{n_i}}{\sqrt{\sum_j \left(n_j^{old} - \frac{\Delta t}{\gamma_1}[F_e]_{n_j}\right)^2}}, \quad (21)$$

$$j \in \{x, y, z\}.$$

From equation (21), one of the most important parameters determining the speed of the calculation is the numerical time step $\Delta t$. When using a relaxation method, there exists a maximum time step, where if the time step is too large, the numerical calculations will give wrong results. In fact, if the numerical time step is above this value, the results will be random numbers. Of course, the value of time step $\Delta t$ is different from the parameters such as the boundary conditions, the grid size, and the viscosity of liquid crystals. The maximum time step can be approximated by examining a simplified relaxation equation:

$$\frac{dn_i}{dt} = \frac{K_{33}}{\gamma_1}\frac{d^2 n_i}{dz^2} \quad (22)$$

$$\Delta t_{max} = \frac{\gamma_1 \Delta z^2}{2K_{33}}.$$

The interaction between the director and the surface is characterized by the "anchoring strength." This is a measure of how rigidly the director at the surface is fixed in its orientation. The higher the anchoring strength, the more likely that the director sticks in place. To describe the interactions between director and surface, the polar anchoring and azimuthal anchoring energies are described herein. The polar anchoring energy is related to how much energy is required to pull the director away from the surface. The azimuthal anchoring energy is a measure of energy required to rotate director right on the alignment surface.

In order to best describe the finite anchoring effects in the Oseen-Frank theory, the Rapini and Papoular (RP) expression is described herein. It is assumed that the anchoring energy density increases in a sine square fashion as the director deviates from the ideal alignment directions:

$$F_{RP} = W \sin^2(\theta - \theta_o), \quad (23)$$

where W is a scalar value known as the anchoring strength and $\theta - \theta_o$ is the angle of departure of the alignment direction. The RP anchoring is a widely used approximation and often used as a reference to which other anchoring representations are compared. A generalization of the RP expression that differentiates between the polar and azimuthal anchoring strengths is:

$$F_{RPgen} = W_p \sin^2(\theta-\theta_o) + W_a \cos^2(\theta-\theta_o)\sin^2(\phi-\phi_o),  \quad (24)$$

where $W_p, W_a$ refer to polar and azimuthal anchoring strengths, and $(\theta-\theta_o), (\phi-\phi_o)$ refer to tilt and azimuthal angles of the director and alignment direction, respectively.

It has been shown by Zhao et al., "Week Boundary Anchoring, Twisted Nematic Effect, and Homeotropic to Twisted Planar Transition," Phys. Rev. E 65, 2002, that a representation of the anisotropic surface-energy density can be simplified to:

$$F_{Zhao} = \Upsilon_1 \sin^2(\theta-\theta_o)\cos^2(\phi-\phi_o) + \Upsilon_2 \sin^2(\theta-\theta_o)\sin^2(\phi-\phi_o). \quad (25)$$

The anchoring strength coefficients can be compared by equaling order terms of spherical harmonics expansions of (24) and can be found as $$\Upsilon_1 = \frac{1}{2}\left(W_p - \frac{5}{8}W_a\right) \quad (26)$$
$$\Upsilon_2 = \frac{1}{2}\left(W_p + \frac{5}{8}W_a\right).$$

According to one embodiment, the surface director must be allowed to move in order to achieve the effect of anchoring energy on the operation of the liquid crystal devices. Therefore, equation (24) must be minimized during the iterations of the simulations.

According to one embodiment, $\phi_1-\phi_2=0$. Such special case assumes that the two alignment domains have the same azimuth alignment angle. According to the embodiment, $\ell_{EEL}$ actually varies according to the domain ratio and the anchoring energy of the alignment domains. The maximum $\ell_{EEL}$ value can become $\leq L$. Here more rigorous examination on the anchoring effects and equivalent extrapolation length will be reported.

Figure 5:
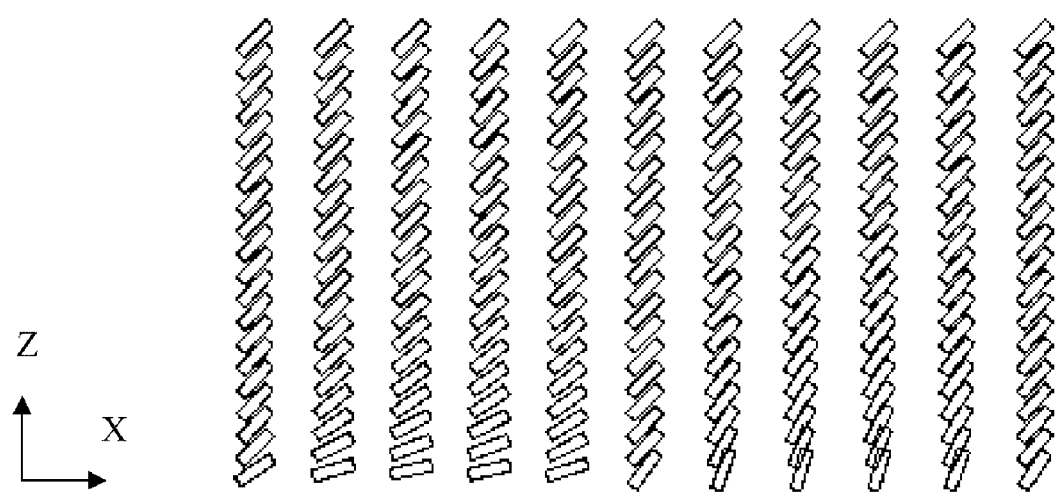
FIG. 5 shows that the polar anchoring energy for the V polyimide is $W_{pV}=0.2\times10^{-3}$ J/m², and the polar anchoring energy for the H polyimide is $W_{pH}=0.2\times10^{-3}$ J/m² (X=200 nm and Z=200 nm)

The effect of anchoring energy on the equivalent extrapolation length is described. It is assumed that the V polyimide induces a pretilt angle of 82 degree, the H polyimide induces a pretilt angle of 0.5 degree, and the domain ratio p is 0.5. The simulation space is $x_{max}=200$ nm by $z_{max}=200$ nm. The polar anchoring energy for the V polyimide is $W_{pV}=0.2\times10^3$ J/m², and the polar anchoring energy for the H polyimide is $W_{pH}=0.2\times10^{-3}$ J/m². The corresponding director distributions are presented in FIG. 5. We can see that the tilt angles deviate from the ideal tilt angles. Such effect becomes more obvious at the boundary of two domains.

Figure 6:
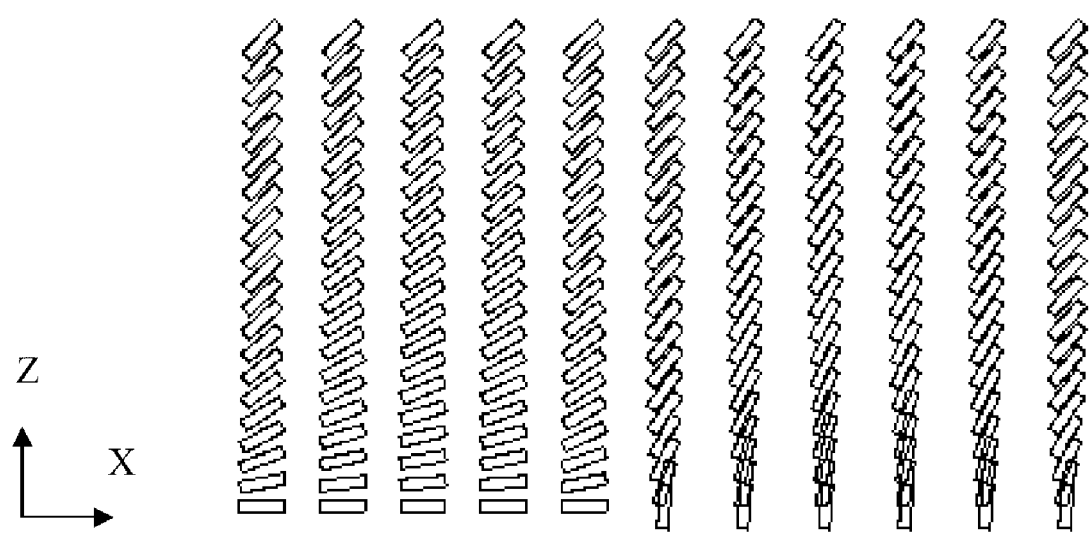
FIG. 6 shows that the polar anchoring energy for the V polyimide is $W_{pV}=2\times10^{-3}$ J/m², and the polar anchoring energy for the H polyimide is $W_{pH}=2\times10^{-3}$ J/m² (X=200 nm, Z=200 nm)
Figure 7:
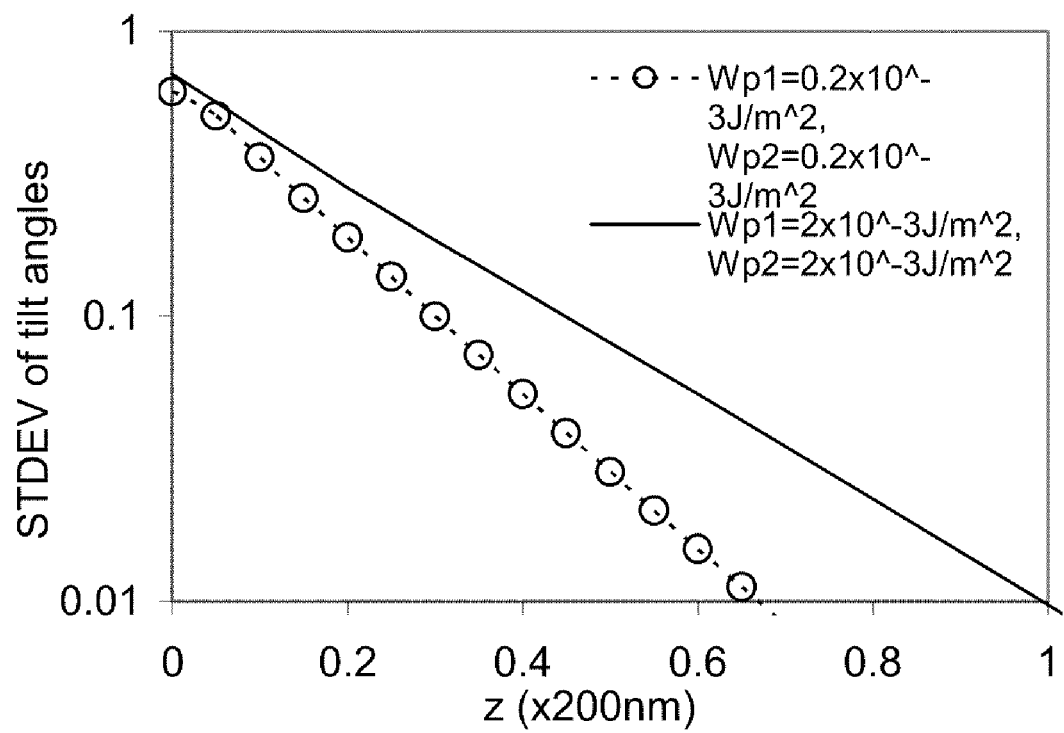
FIG. 7 shows that the profiles of the standard deviation of the liquid crystal tilt angles along the z axis.

If the anchoring energy of the alignment surface increases, such an effect is suppressed as shown in FIG. 6. Furthermore, by comparing these two figures, we can find that the $\ell_{EEL}$ is modulated by the anchoring energy. Such observations can be made in FIG. 7. The liquid crystal relaxes to homogenous tilt angles exponentially along the z direction. Strong anchoring energy makes the decay ratio become much slower and causes $\ell_{EEL} \approx L$. Since the typical anchoring energy for the polyimide is about $2\times10^{-3}$ J/m², the $\ell_{EEL}$ must be smaller than <L. FIG. 7 also shows important information that, as the anchoring energy decrease, the equivalent extrapolation length will also decrease as well.

Figure 8:
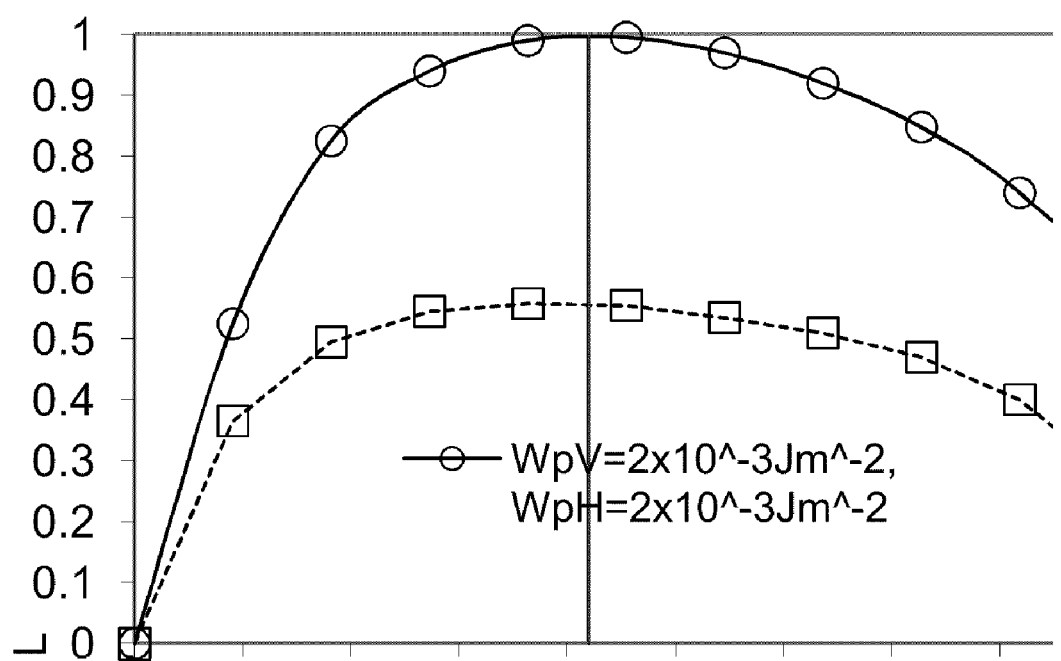
FIG. 8 illustrates the $\ell_{EEL}/L$ ratio for different domain ratio p.

Other than the anchoring energy, the domain ratio p also plays an important role for the $\ell_{EEL}$ modulation. FIG. 8 shows the corresponding effects for different p. The position of the maximum $\ell_{EEL}$ is governed by the p ratio and the pretilt angles of the domain area. The anchoring energy does not play any role under such situation. Maximum $\ell_{EEL}$ study is very important in backflow direction control.

The case of $\phi_1-\phi_2 \neq 0$ is very important in liquid crystal configuration control. By controlling the fan angles of the principle and secondary alignment axes, the resultant pretilt angle and azimuthal angle of the liquid crystal can be altered. It provides a strong tool to liquid crystal mode designer, or optical waveguide designer to control the precise position and magnitude of the resultant pretilt angles inside the liquid crystal bulk.

Figure 9:
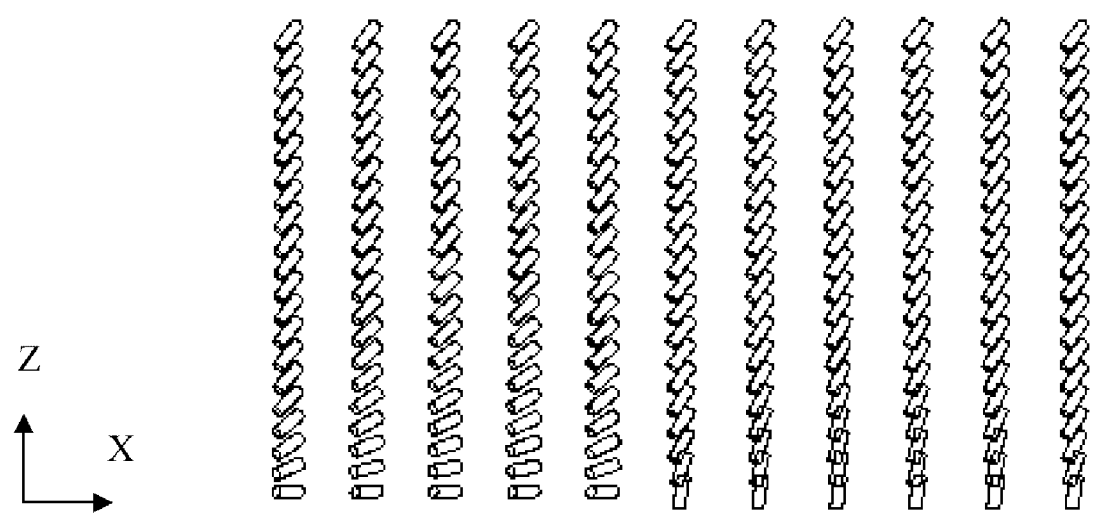
FIG. 9 illustrates the liquid crystal configurations near the alignment surface. The H-polyimide has the pretilt and azimuthal angles of 0.5 and 45 degrees, respectively. And the V-polyimide has the pretilt and azimuthal angles of 82 and 0 degrees, respectively.
Figure 10:
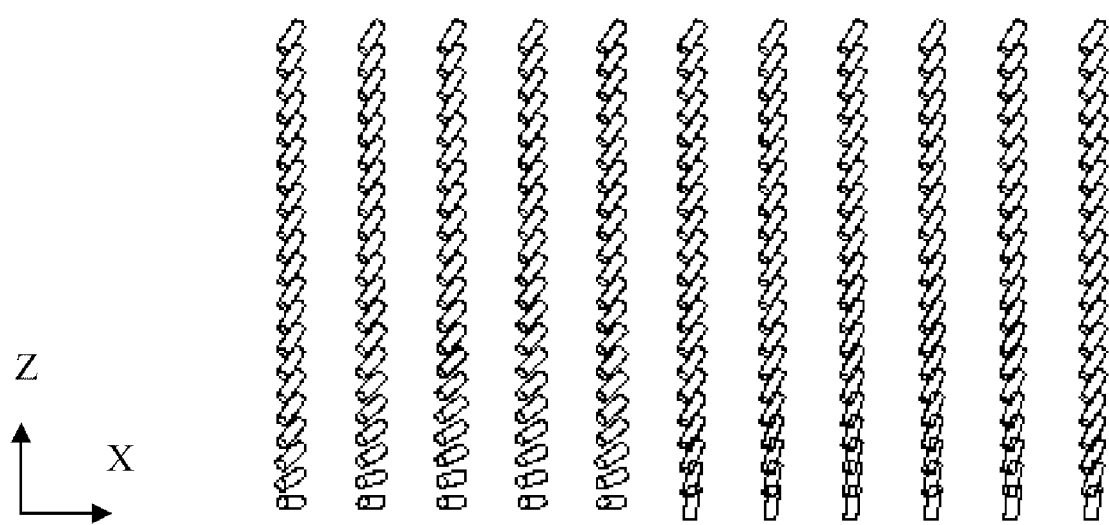
FIG. 10 illustrates the liquid crystal configurations near the alignment surface, where the H-polyimide has the pretilt and azimuthal angles of 0.5 and 60 degrees, respectively, and the V-polyimide has the pretilt and azimuthal angles of 82 and 0 degrees, respectively.
Figure 11:
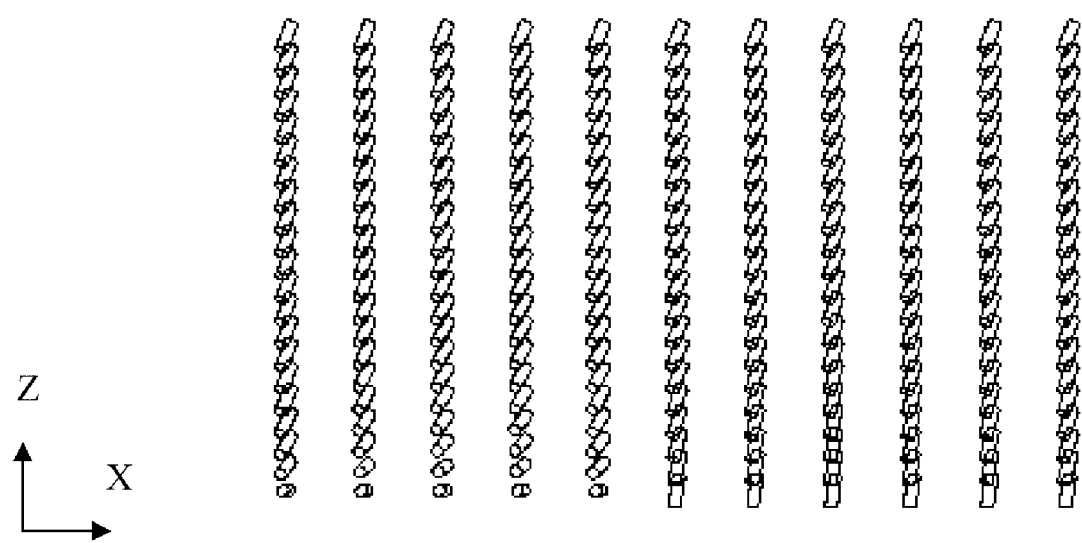
FIG. 11 illustrates the liquid crystal configurations near the alignment surface, where the H-polyimide has the pretilt and azimuthal angles of 0.5 and 80 degrees, respectively, and the V-polyimide has the pretilt and azimuthal angles of 82 and 0 degrees, respectively.

FIGS. 9 to 11 show the molecular configurations for different fan angles. The domain ratio for those figures is p=0.5, the resultant pretilt angles are altered by the fan angles at the surface. Also there is an initial azimuthal angles $\phi_o=|\phi_1-\phi_2|$ induced by such an alignment arrangement.

Figure 12:
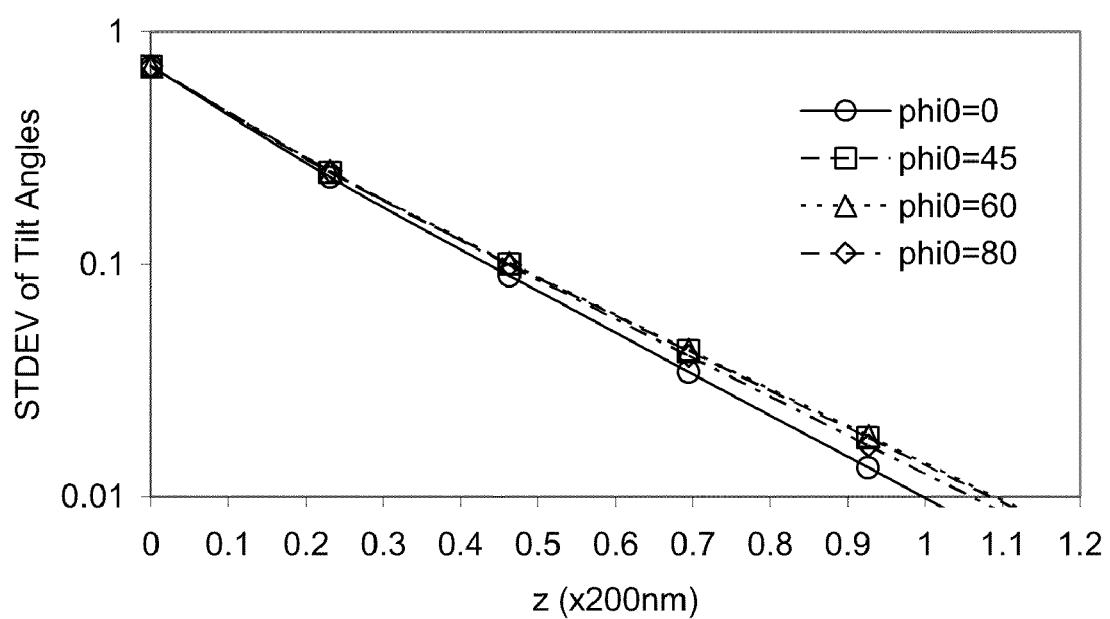
FIG. 12 illustrates profiles of the standard deviation of the liquid crystal tilt angle along the z axis for different fan angles $\phi_o$ and p=0.5.

The standard deviation of tilt angle and azimuthal angle across the z directions are plotted in FIG. 12. It can be observed that the equivalent extrapolation length increases while the fan angles increases.

Such simulation results can be explained by equation (2). Since the surface profile p is the same for different fan angles $\phi_o$, the surface anchoring energy remains constant. But there is the twisted term induced in the Frank energy. Therefore, the equivalent extrapolation length has to increase in order to minimize the total amount of energy. It can be forecasted that liquid crystal with stronger $K_{22}$ will further increase.

Figure 13:
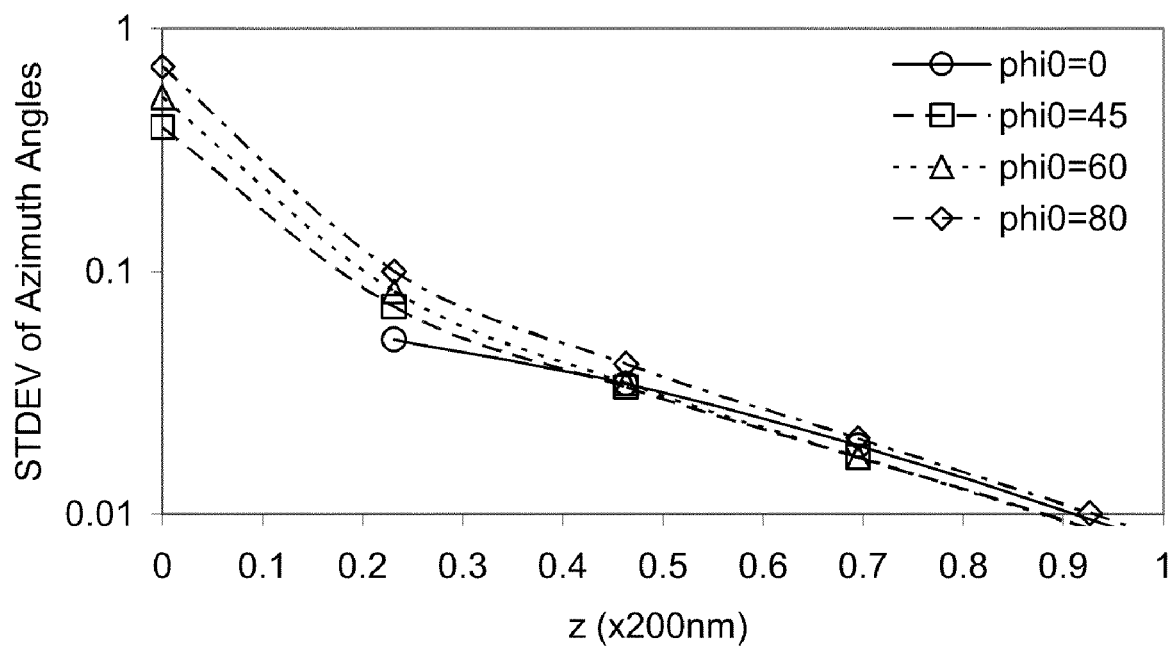
FIG. 13 illustrates profiles of the standard deviation of the liquid crystal azimuthal angle along the z axis for different fan angles $\phi_o$ and p=0.5.

FIG. 13 shows the profiles of the standard deviation of the liquid crystal azimuthal angles along the z axis for different $\phi_o$. The domain ratio p is 0.5. The situation is similar for the polar angles. The maximum equivalent extrapolation length is about L.

Figure 14:
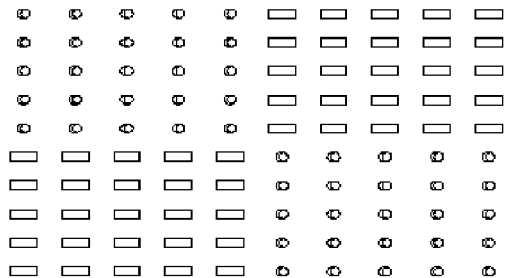
FIG. 14 illustrates the liquid crystal molecule alignment on the X-Y plane for fan angles $\phi_o$=0 and p=0.5.
Figure 14:
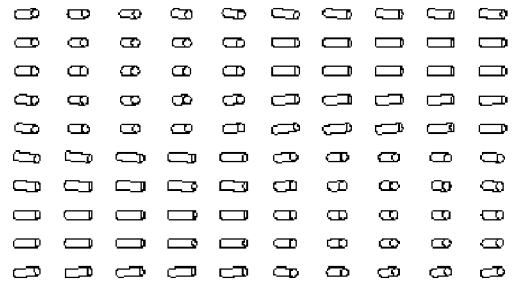
Figure 14:
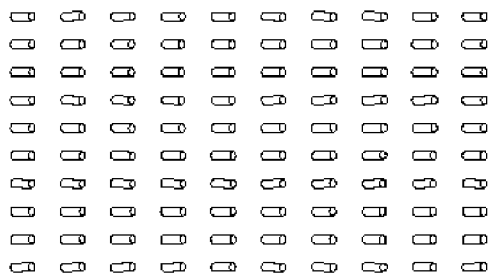
Figure 14:
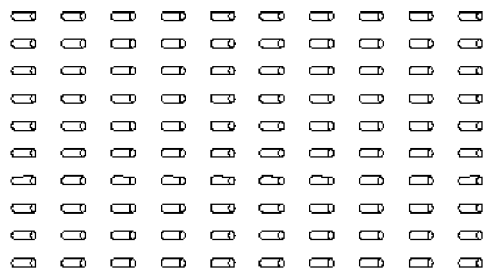

There is some disorder effects on azimuthal angles for the case $\phi_o=0$. It is supposed that it should be equal to 0 along the z direction. Actually, it is induced by the edging effect of the patterning structures. To illustrate the issue, the liquid crystal molecule alignments on the X-Y plane are shown in FIG. 14. When z/L=0.0, the strong anchoring energy prevents the molecule alignment away from the slow axis. However, as the anchoring energy effect reduce at high position z/L=0.23, the edging effect appears. Finally, the anchoring energy will disappear, and the Frank elastic energy is dominant in the system at z/L>0.5, therefore such an edging effect will finally disappear.

The average pretilt angle simulation results are different from those described by Wan. It was found that if the domain size L is not comparable to the extrapolation length $\ell_e=K/W$, the pretilt angle is linearly proportional to the domain ratio p. Furthermore, if the fan angle $\phi_o>0$, the average pretilt angle is always higher than that in the case of $\phi_o=0$, if and only if the Frank constant $K_{11}<K_{33}$. Actually, such property is always true for conventional liquid crystal.

Figure 15:
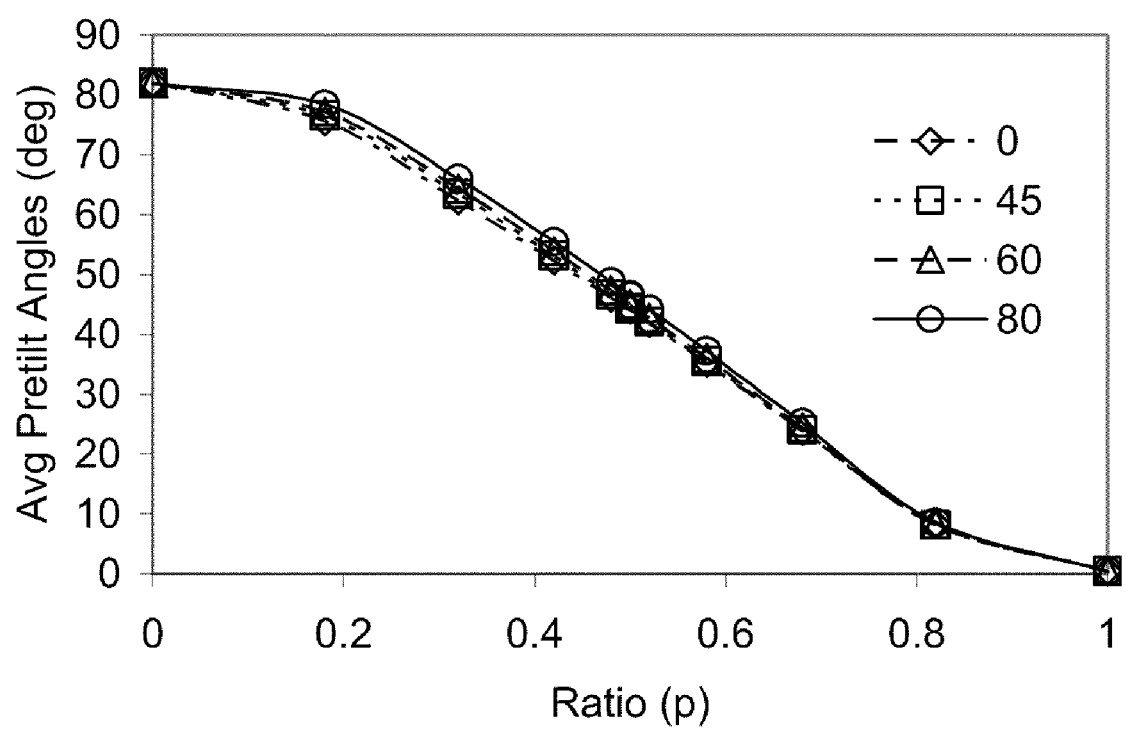
FIG. 15 illustrates the average pretilt angle at different fan angles generated by a patterned alignment surface.

FIG. 15 shows that some non-linear effect at p=0.1 and p=0.9 from the numerical simulations. Since the simulation dimension is L=200 nm, p=0.1 and p=0.9 induce the $L_{0.1H/0.9V}=20$ nm/180 nm and $L_{0.9H/0.1V}=180$ nm/20 nm, respectively. The anchoring energy for simulations is $2\times10^{-3}$ J/m², and the extrapolation length is $\ell_e=\hat{K}/W=15.25\times10^{-12}/2\times10^{-3}=7.625$ nm. Since the values are comparable, therefore, the non-linear effect is found at the head and tail of the curve.

Figure 16:
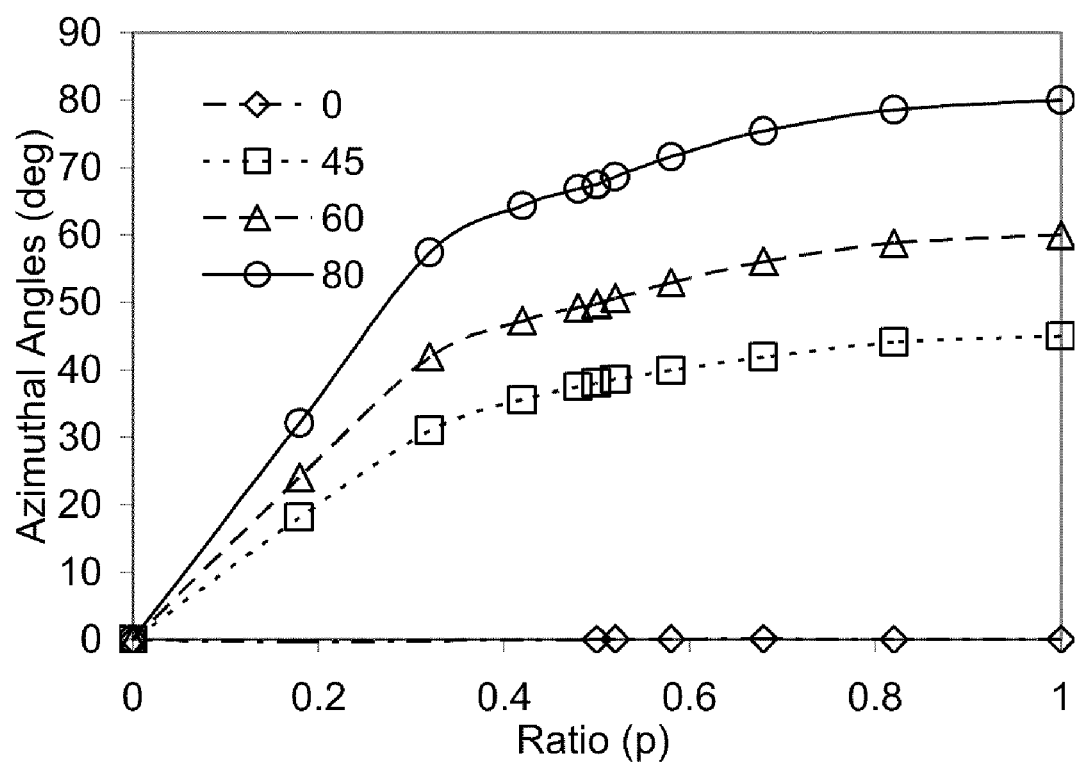
FIG. 16 illustrates the average azimuthal angle at different fan angles generated by a patterned alignment surface.
Figure 17:
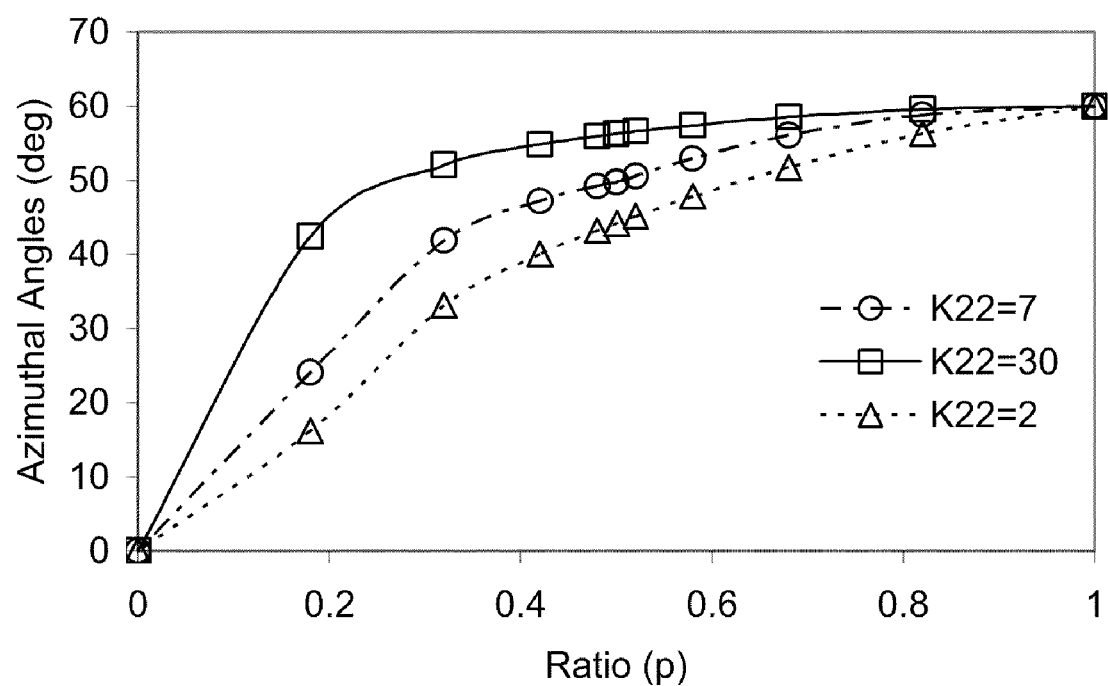
FIG. 17 illustrates the effect of $K_{22}$ on the azimuthal angle.

When the azimuthal angles are different (fan angle), other effects can occur. The results are plotted in FIG. 16. It can be seen that as the ratio p increases, the azimuthal angles will finally turn into the secondary principle alignment direction of the H-polyimide. The results show that the change is not linear. It is due to the different Frank constants $K_{22}$ and $K_{33}$. According to the Frank elastic energy, the bend term actually collaborate with $K_{22}$ and $K_{33}$. It causes a non-linear effect on the twist term. Such an effect becomes more significant at the high pretilt angle p<0.4, since the bend effect dominates the bulk energy. To suppress such effect, a weaker $K_{22}$ is recommended, as shown in FIG. 17.

Based on the above models and simulation results of the inhomogeneous alignment, various embodiments of the present invention are described below.

There are many different inhomogeneous liquid crystal alignment methods, such as e-beam treatment, micro-rubbing, mixing of polyimide materials, and DUV surface treatment. Polyimide mixing generally comprises two kinds of polyimide materials that respectively lead to different LC orientations. Micro-domain can be achieved by hydrodynamic effects on phase separation of the horizontal and vertical polyimide mixture in three dimensions. In existing systems, the domain patch is about 2 μm. Such size, however, is not in a desirable range for high pretilt angles alignment as described earlier.

In fact, the size of the patchy pattern is governed by the hydrodynamic effect on phase separation. It is difficult to control phase separation in a fluid mixture. The segregation originates from the fact that there exist two relevant transport mechanisms for fluid mixtures, i.e., diffusion and hydrodynamic flows, and they are coupled with each other in a complicated manner. Only the former is responsible for the temporal increase in the order parameter (composition differences between two phases), and the latter only causes geometrical coarsening. Because of the complex nature of their non-local and nonlinear coupling, the hydrodynamic effects on phase separation have not been fully understood even for simple fluid mixtures. For example, there has been no well established theory describing the phase separation kinetics of 3D fluid mixtures. Lacking good methods to control the rate of phase separation, the reproducibility and uniformity of pretilt angle generation are found poor. Due to these problems, such method is not an ideal model to obtain high pretilt angles in liquid crystals and therefore a more desirable method is described herein.

In one embodiment, a two-step process is provided for fabricating the new alignment layer. A uniform alignment layer is first coated on a substrate. Then a second alignment layer is coated on top of the first alignment layer. This second alignment layer is discontinuously distributed. According to a further embodiment, the second alignment layer is in the form of discontinuous island structures. Or, the second alignment layer includes one or more network structures. Alternatively, the second alignment layer includes "hills" and "valleys" structures. The height difference between the "hills" and "valleys" structures can range from 1 nm to 200 nm.

Figure 18:
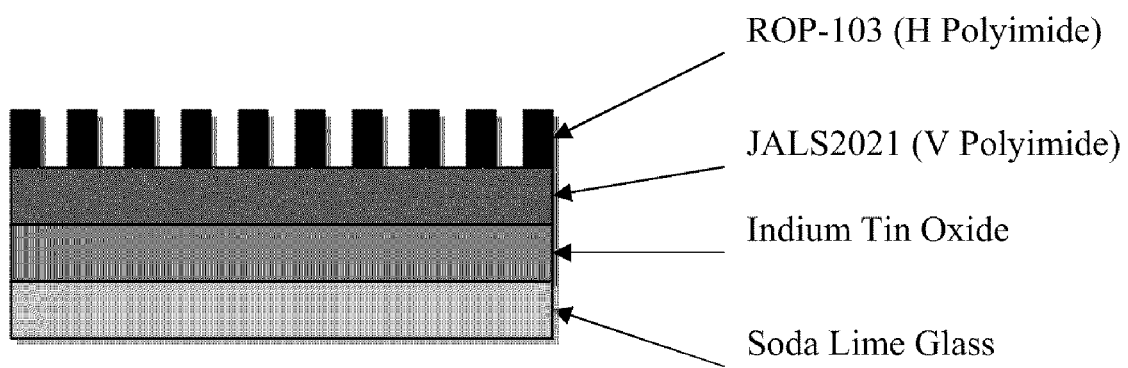
FIG. 18 illustrates the stacked structure including Glass/ITO/JALS2021/ROP-103.

As depicted in FIG. 18, unlike the existing methods for obtaining alignments in liquid crystals, the method described herein utilizes a stacked structure. According to one embodiment, the first alignment layer is a vertical alignment polyimide obtained from the Japan Synthetic Rubber Company, model number JALS2021. The second alignment layer includes a photoalignment material. In this example, it is a commercial material obtained from the Rolic Company, model number of ROP-103, inducing the horizontal alignment. There are alternative materials which are suitable for the first and second alignment layer, such as vertical or planer aligned polyimide, or photo-alignment materials including azo-dyes and acrylic derivatives.

The structured depicted in FIG. 18 is obtained based on the convenience of experiment only. Other arrangements of various layers are possible. For example, according to another embodiment, the order of the two alignment materials can be swapped or reversed. In other words, the first alignment layer continuously coated on the substrate is a photoalignment material such as the ROP-103, and the second alignment layer discontinuously coated on top of the first alignment layer is a vertical alignment polyimide such as the JALS2021.

Figure 38:
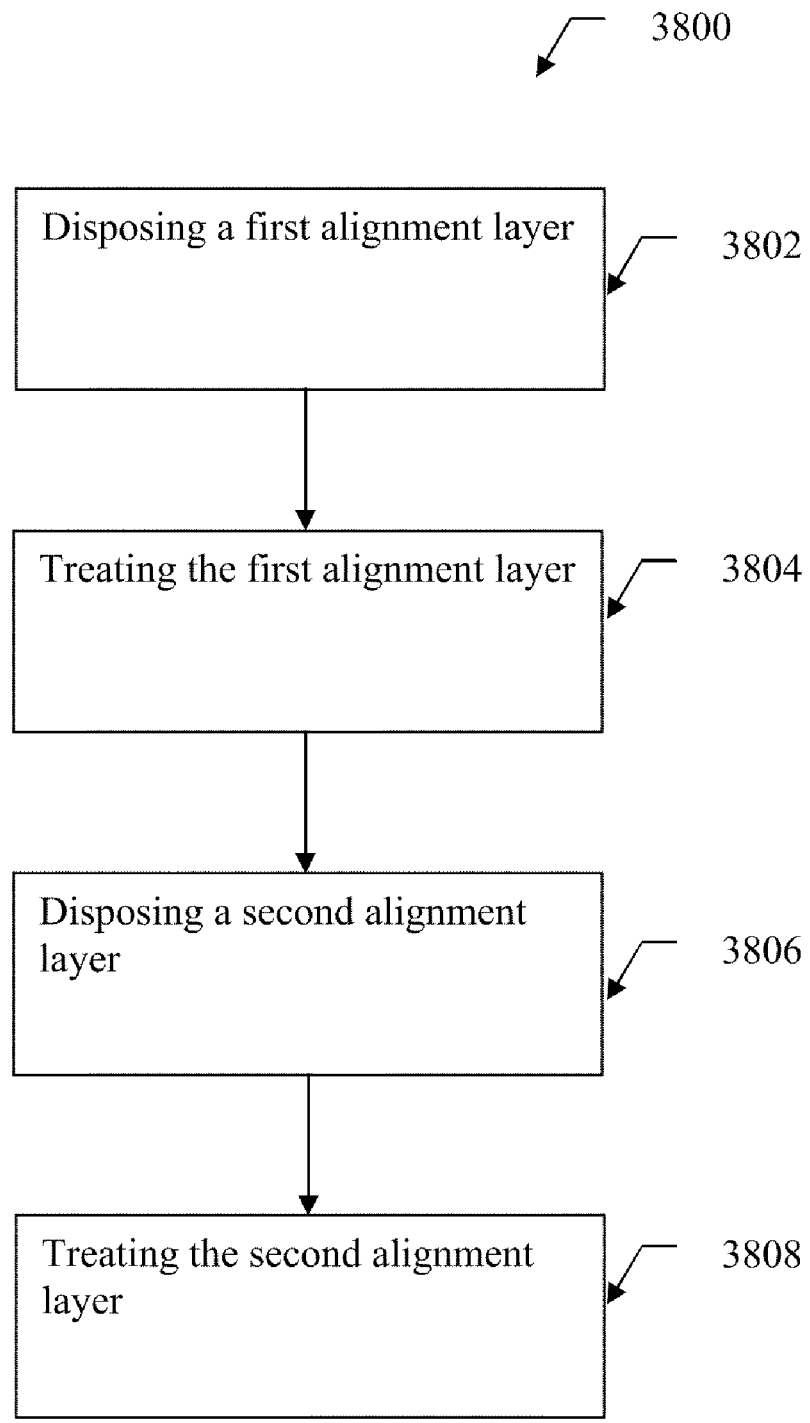
FIG. 38 depicts a method for producing a liquid crystal alignment layer in a liquid crystal cell according to one embodiment of the invention.

The detail experiment steps for obtaining the structure illustrated in FIGS. 18 and 38 are as follows: Firstly, a first alignment layer including the vertical polyimide is spin-coated on the substrate including Soda Lime Glass and Indium Tin Oxide at 3000 rpm for 240 seconds (block 3802). Other coating methods including ink jet printing can also be used. The first alignment layer is then treated for inducing a first pretilt and a first azimuthal angles in liquid crystal cells (block 3804). Specifically, the substrate undergoes soft-bake at 100 degrees Celsius for 300 seconds. Thirdly, it is hard-baked at 200 degrees Celsius ~230 degrees Celsius for about 1~1.5 hours to allow the polyimide to imidize and become permanent. After the first layer is finished, another alignment layer (i.e., the second alignment layer) is applied on top of the first alignment layer (block 3806). Similar to the first alignment layer, the second one is also coated on the substrate using the spin-coater. The coating parameters are 1000 rpm for 60 seconds. Afterward, the second alignment layer is then treated for inducing a second pretilt and azimuthal angles in the liquid crystal cells (block 3808). Specifically, the substrate including the alignment layers undergo soft-baking at 130 degrees Celsius for 300 seconds. At the end, the substrate is exposed to a polarized 340 nm light source. The dosage is about 200 mJ/cm$^2$. Alternatively, the dosage can be higher than 200 mJ/cm$^2$. As depicted in FIG. 18, the upper alignment layer (i.e., the second alignment layer) is actually a discontinuous film, while the first alignment layer disposed beneath the second alignment layer is a continuous film. With such a configuration, not only the second alignment layer but also the first alignment layer will effect the alignment of the liquid crystals.

According to a further embodiment, it is possible to manipulate the alignment layers to provide a discontinuous or continuous alignment films by controlling the Bénard-Marangoni convection during soft-baking. In order to obtain this stacked structure, a high viscosity solvent, called $S_1$, is selected for those alignment materials of the first (i.e., lower) alignment layer, so that the Marangoni Number is smaller than 80. Accordingly, a continuous alignment film is obtained after evaporation of the solvent. On the other hand, a low viscosity solvent $S_2$, is selected for the alignment materials at the second (i.e., upper) alignment layer, hence, the Marangoni Number (Ma) will increase and the convection occurs during soft-baking. Since the alignment material has much higher boiling temperature, therefore, once the solvent is evaporated, the alignment materials will record the pattern of the convection. According to still a further embodiment, the alignment material of the lower alignment layer is chosen such that it is not dissolvable in $S_2$. One of proposed combinations are JALS2021 wt 4%: N-Methylpyrrolidone wt 96%/ROP-103 wt<10%: Cyclopentanone wt>90%.

Figure 19:
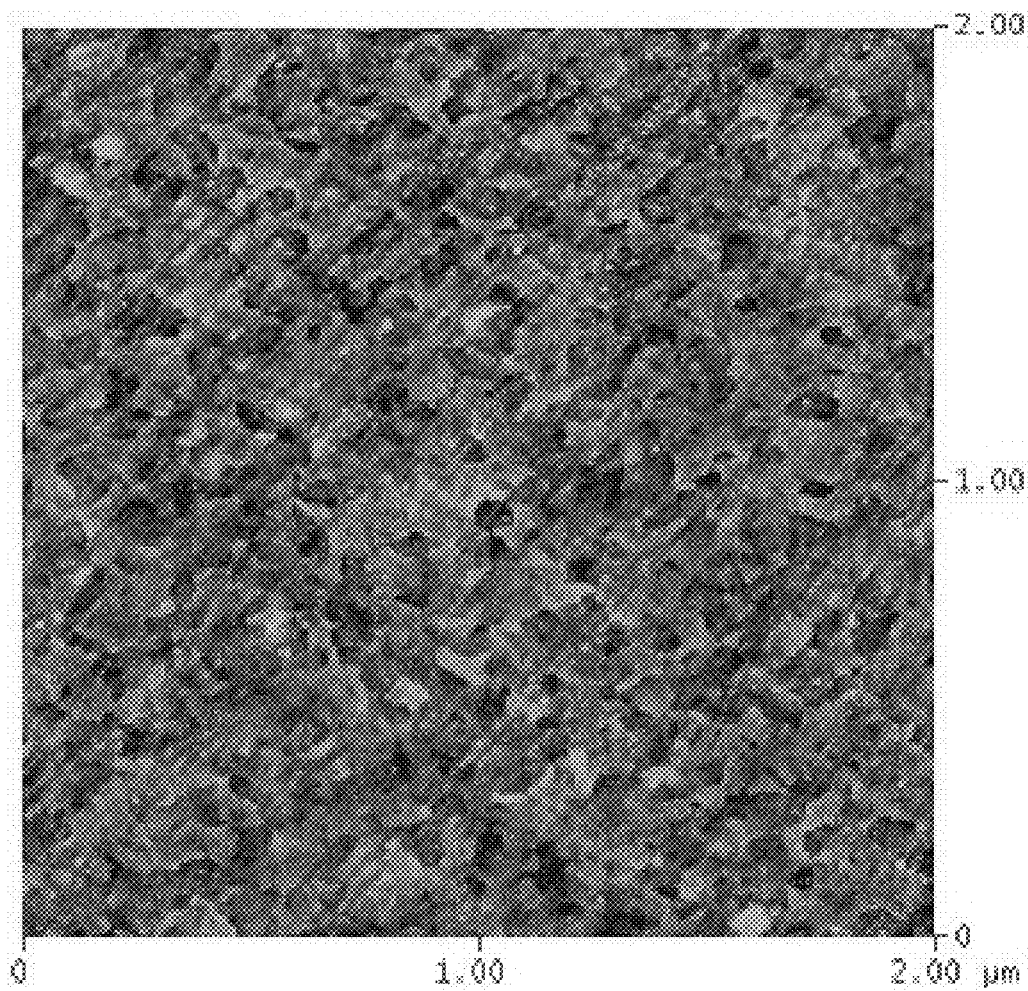
FIG. 19 illustrates an atomic force microscopic picture of the indium tin oxide layer.
Figure 20:
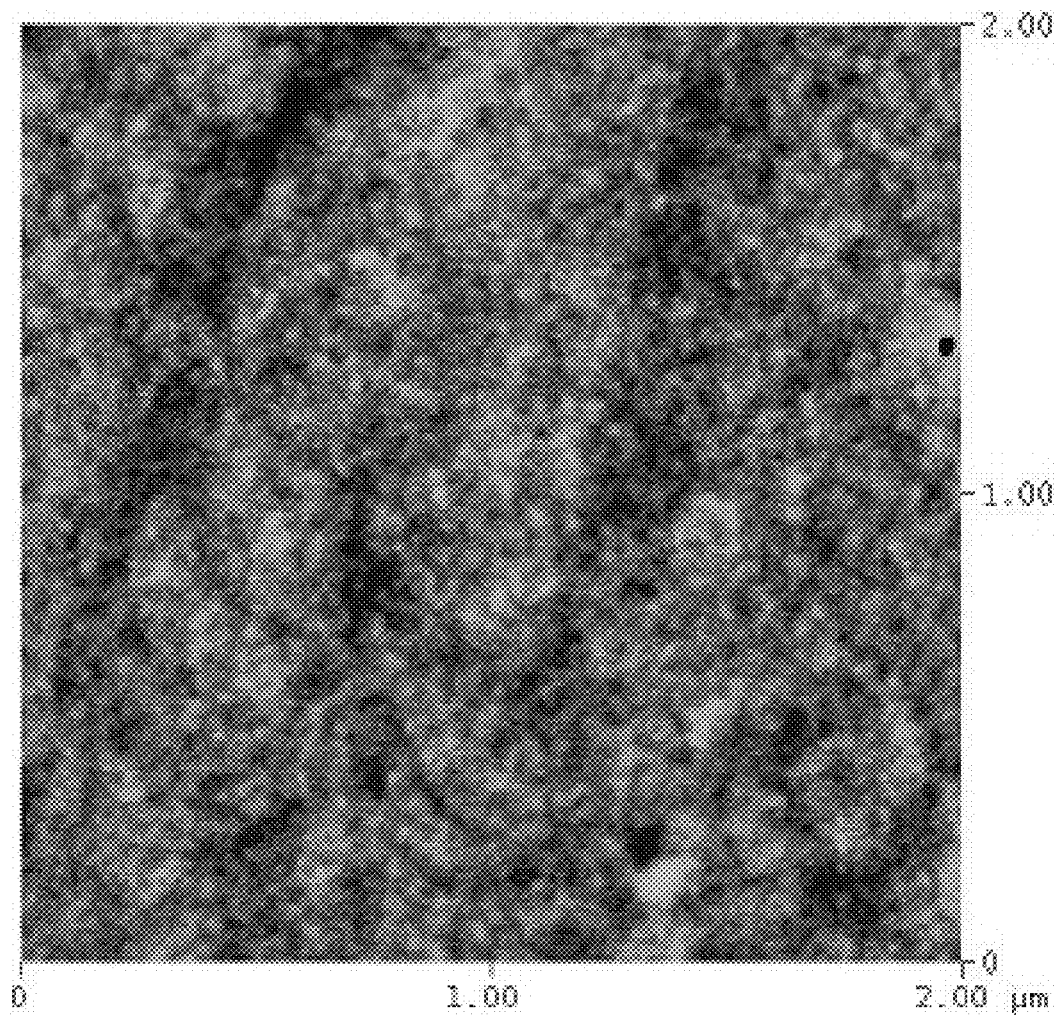
FIG. 20 illustrates an atomic force microscopic picture showing that a continuous alignment layer is successfully coated on top of the ITO layer.

Described below is one example for obtaining the alignment structure described above. Specifically, the first alignment layer solution is applied onto the ITO substrate as shown by the atomic force microscopic picture in FIG. 19. After the hard-baking, another atomic force microscopic picture shown in FIG. 20 is captured. A comparison of the image pattern in FIG. 19 and that in FIG. 20 reveals that the ITO pattern completely disappears after the baking process, showing that a continuous alignment layer has been successfully coated on the ITO surface.

Figure 21:
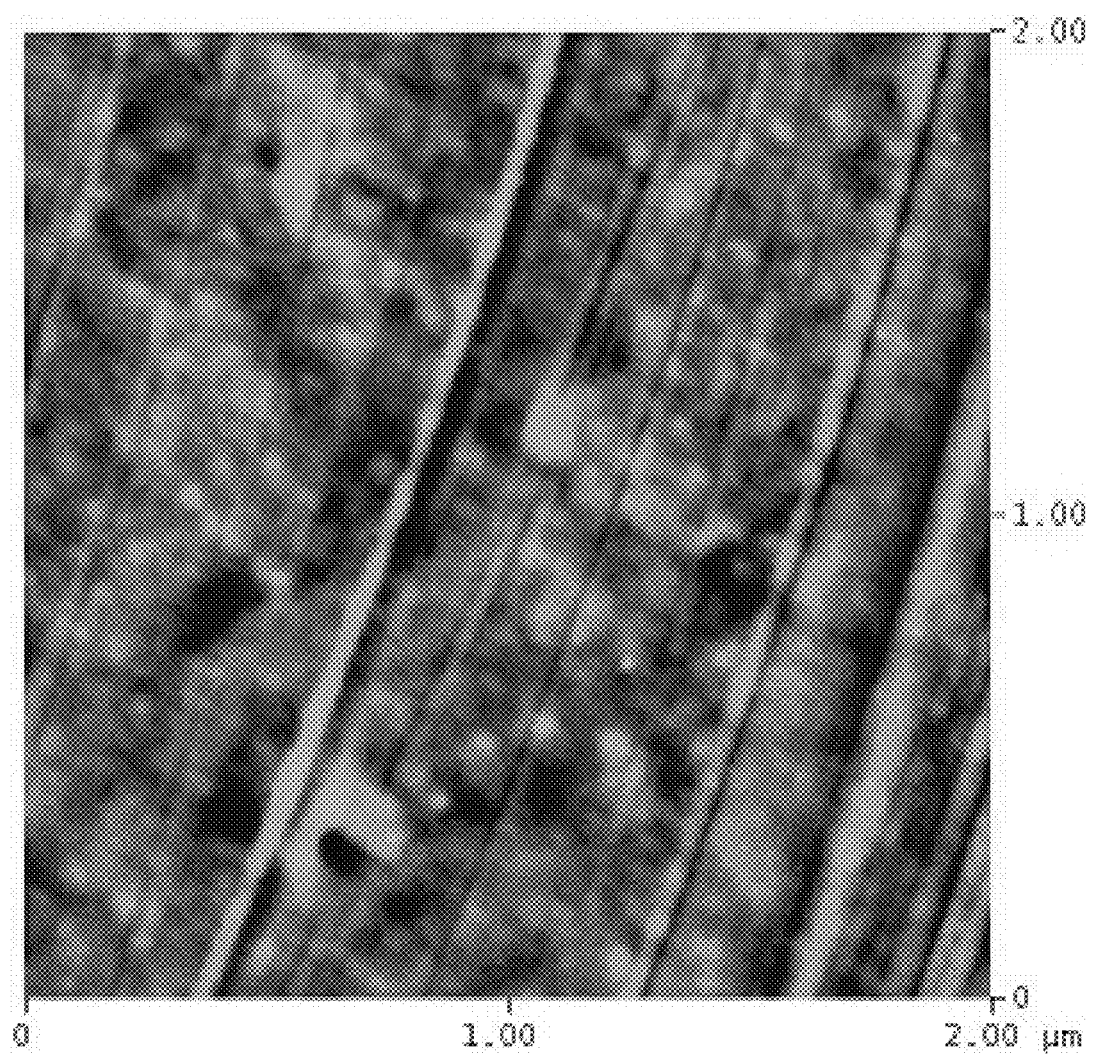
FIG. 21 illustrates an atomic force microscopic picture of a mechanical rubbed continuous alignment layer, where periodic stripes of the rubbing pattern are shown along the rubbing direction.

Subsequently, the coated substrate will undergo mechanical rubbing. Accordingly, a periodic pattern is introduced along the rubbing directions as shown FIG. 21.

Figure 23:
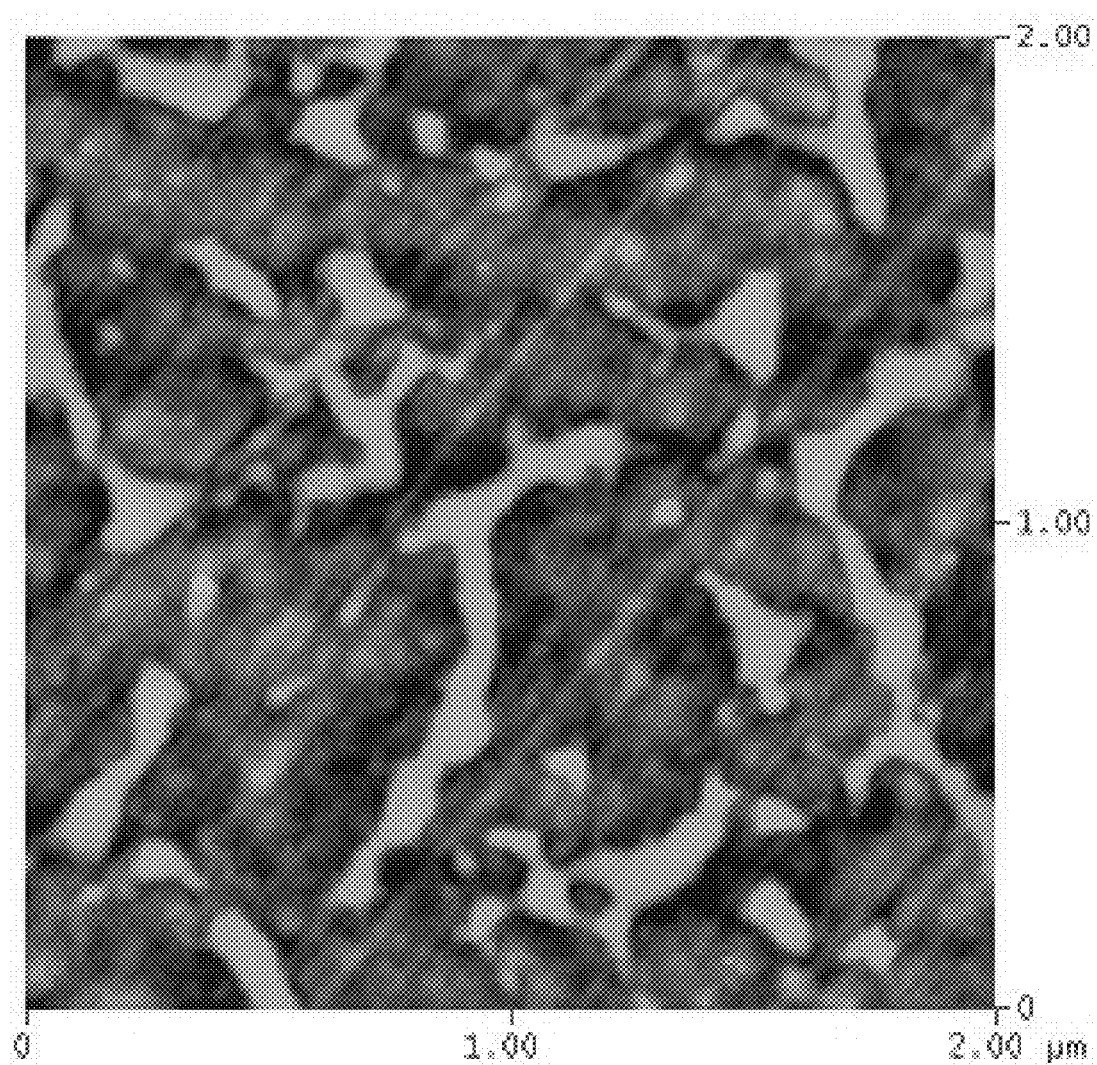
FIG. 23 illustrates a 4% of the ROP-103 applied on the V-alignment polyimide surface.
Figure 24:
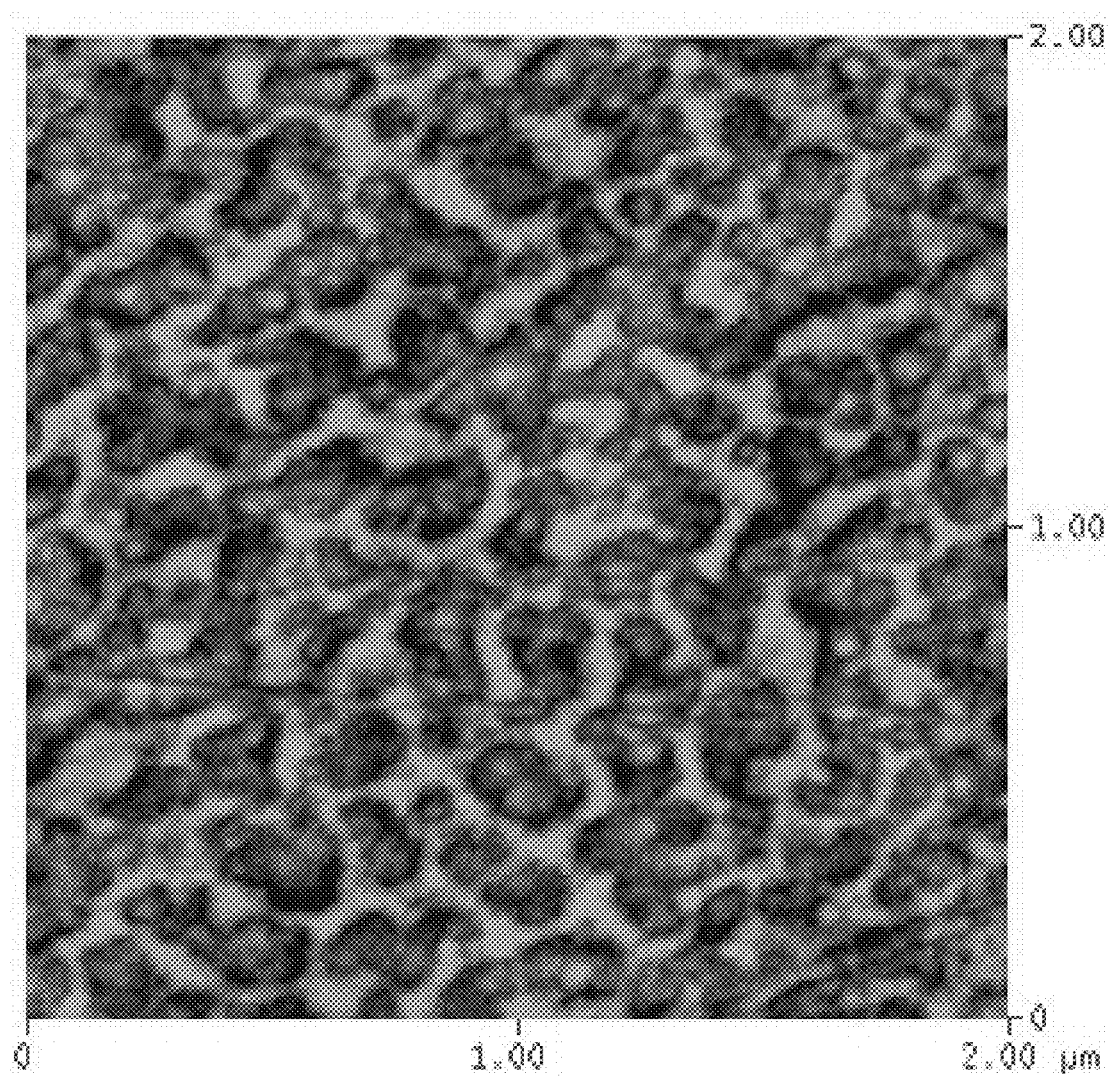
FIG. 24 illustrates a 6% of the ROP-103 applied on the V-alignment polyimide surface.
Figure 25:
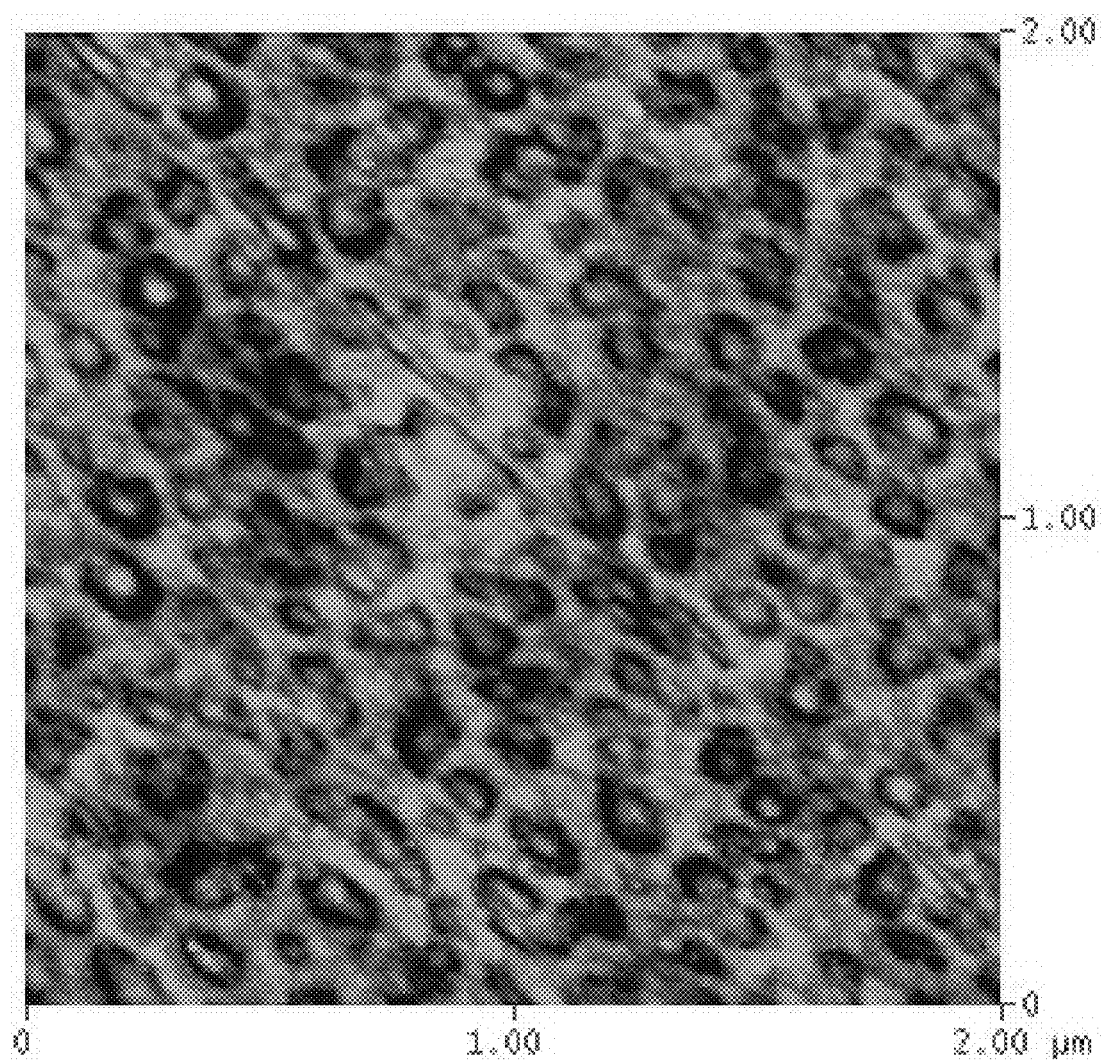
FIG. 25 illustrates an 8% of the ROP-103 applied on the V-alignment polyimide surface.
Figure 26:
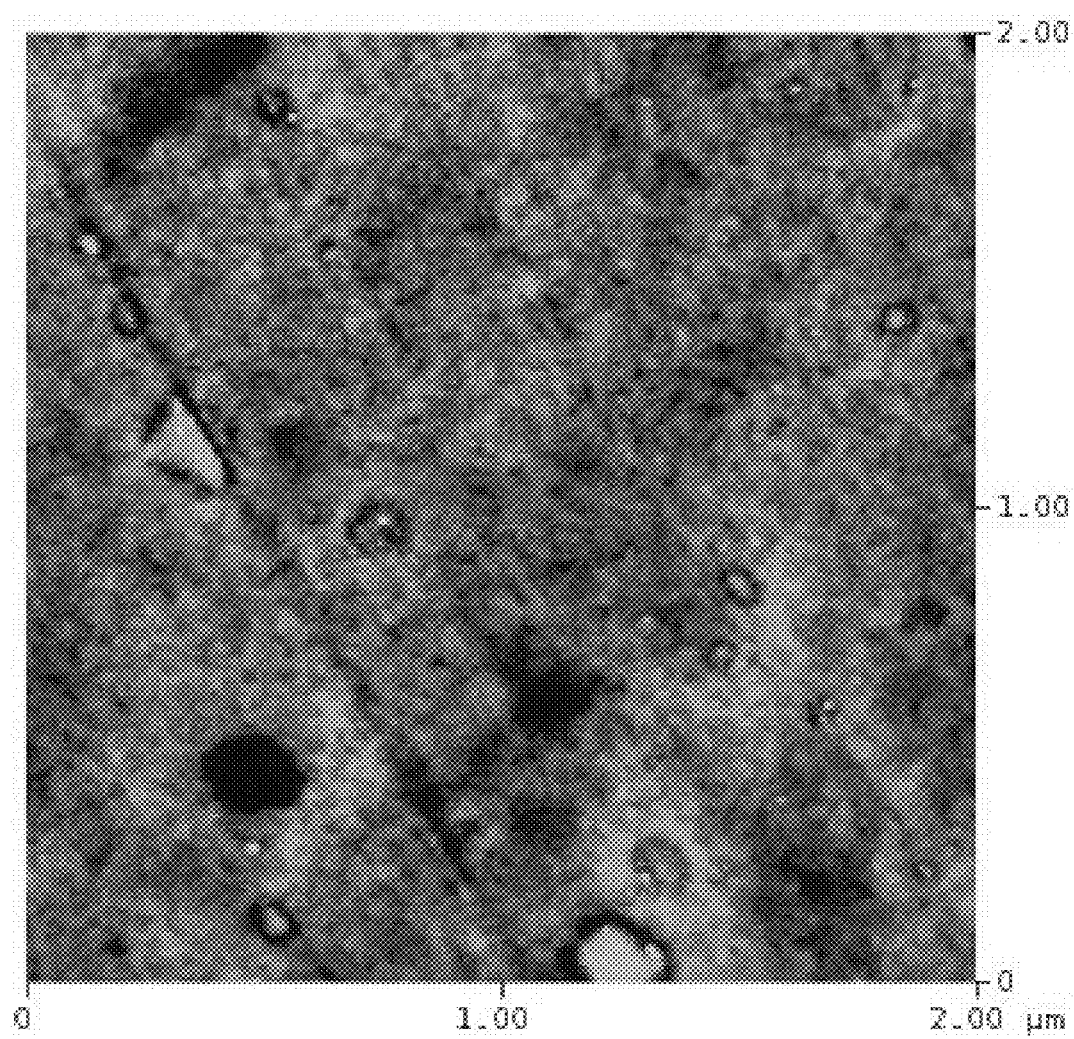
FIG. 26 illustrates a 10% of the ROP-103 applied on the V-alignment polyimide surface.

The substrate is now ready for the final steps. The second alignment material solution is applied on the first alignment layer. For the experimental purpose, different concentrations (i.e., 2%, 4%, 6%, 8%, and 10%) of the ROP-103 are respectively applied to five experimental structures. The resulting structures are shown in the atomic force microscopic images of FIGS. 22-26. The structures are formed by polymer thin film dewetting or Bénard-Marangoni convection as described above. As depicted by these figures, when the concentration of ROP-103 is increased, the thickness of the alignment layer will increase accordingly under the same spin coating condition. As the thickness of the alignment layer increase, the dewetting will become difficult to occur and finally a continuous film will be disposed on top of the first alignment layer (FIG. 26). At that time the resultant pretilt angle should be very low or even equal to the principle pretilt angle of the second alignment layer. The atomic force microscopic images of FIGS. 22-26 show a good agreement between the assumption and the experimental results. Specifically, in FIG. 22, the second layer includes isolated island structures represented by the bright dots. As the concentration of ROP-103 increased, the isolated structures started to merge to form one or more network structures (FIGS. 23-24). As the concentration of ROP-103 continues to increase, the hill and valley structures start to form on the second layer (FIG. 25).

Figure 22:
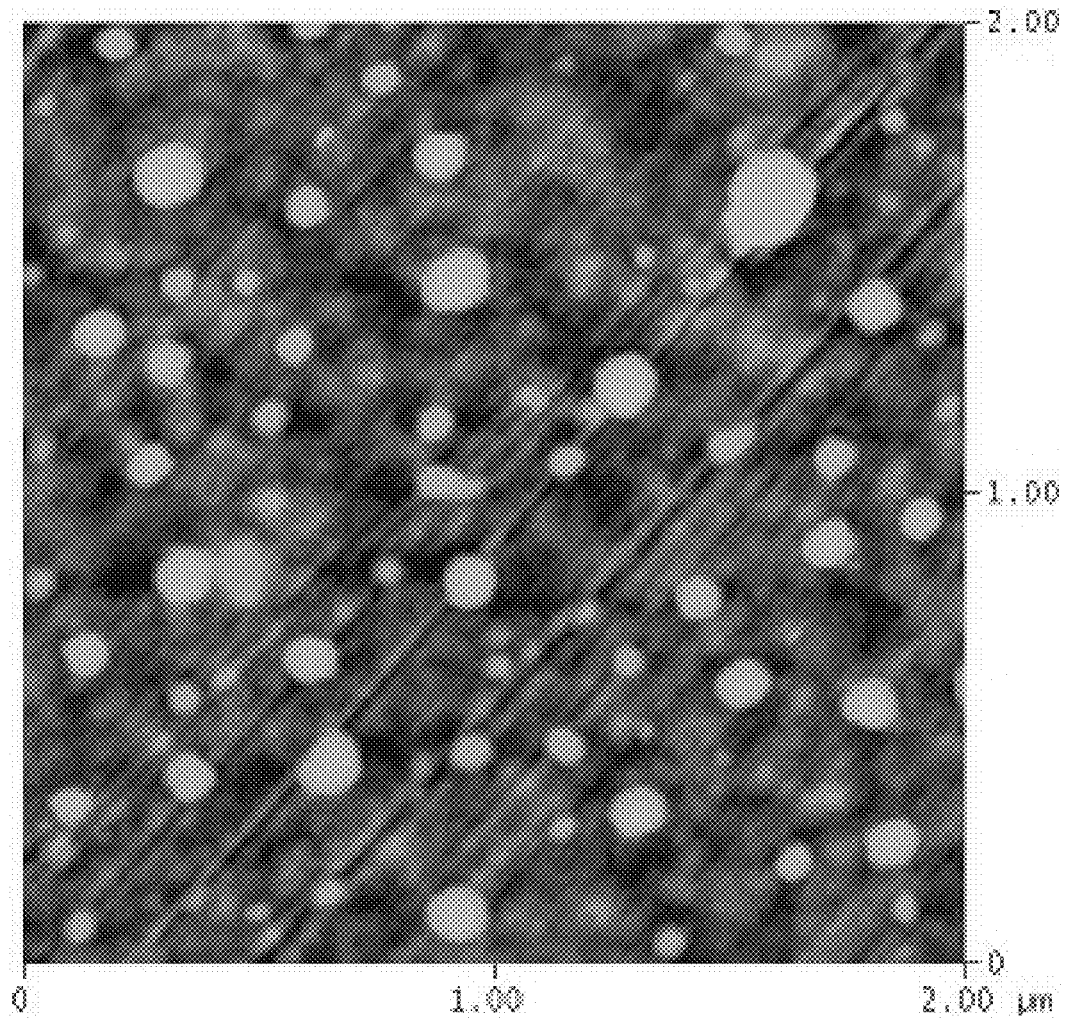
FIG. 22 illustrates a 2% of the ROP-103 applied on the V-alignment polyimide surface.

As further shown in FIG. 22 where the concentration of the ROP-103 is 2%, there are many small domains which are evenly distributed on the alignment surface. It is due to the position of descending of the cool fluid or position of ascending of the hot fluid, and the high boiling point polyimide deposited at that regions while the solvent is evaporated away. As the concentrations increase to 4% as shown in FIG. 23, some network segments start to form. In FIGS. 24 and 25 where the concentration of the ROP-103 is increased to 6% and 8%, respectively, more obvious cells which have hexagonal symmetry can be found. When the concentration of solution is increased to 10% as shown in FIG. 26, the viscosity of the solution will also increase; hence, a continuous film is formed as a result.

FIGS. 22-25 also show the uniformity of the domain. The mean patch size is about 250 nm. As discussed earlier, it is assumed that the alignment materials have strong anchoring energy and the domain size is not comparable with their extrapolation length, the generated pretilt angle changes almost directly proportionally to the ratio of the two domains. To verify this assumption, six sample cells with anti-parallel alignment directions have been tested. The alignment surface of each sample cell is prepared according to the structure of the stacked alignment layers. Specifically, the discontinuous layer of each sample cell is coated using different concentration of the ROP-103 solution. The concentration of the ROP-103 solution is selected from 0%, 2%, 4%, 6%, 8%, 10%. The upper and lower alignment layer substrates are separated by a 5 μm spacer. All samples are filled with liquid crystal MLC-6080 from Merck. The generated pretilt angles are measured using a crystal rotation method. The experimental results are described below.

Figure 27:
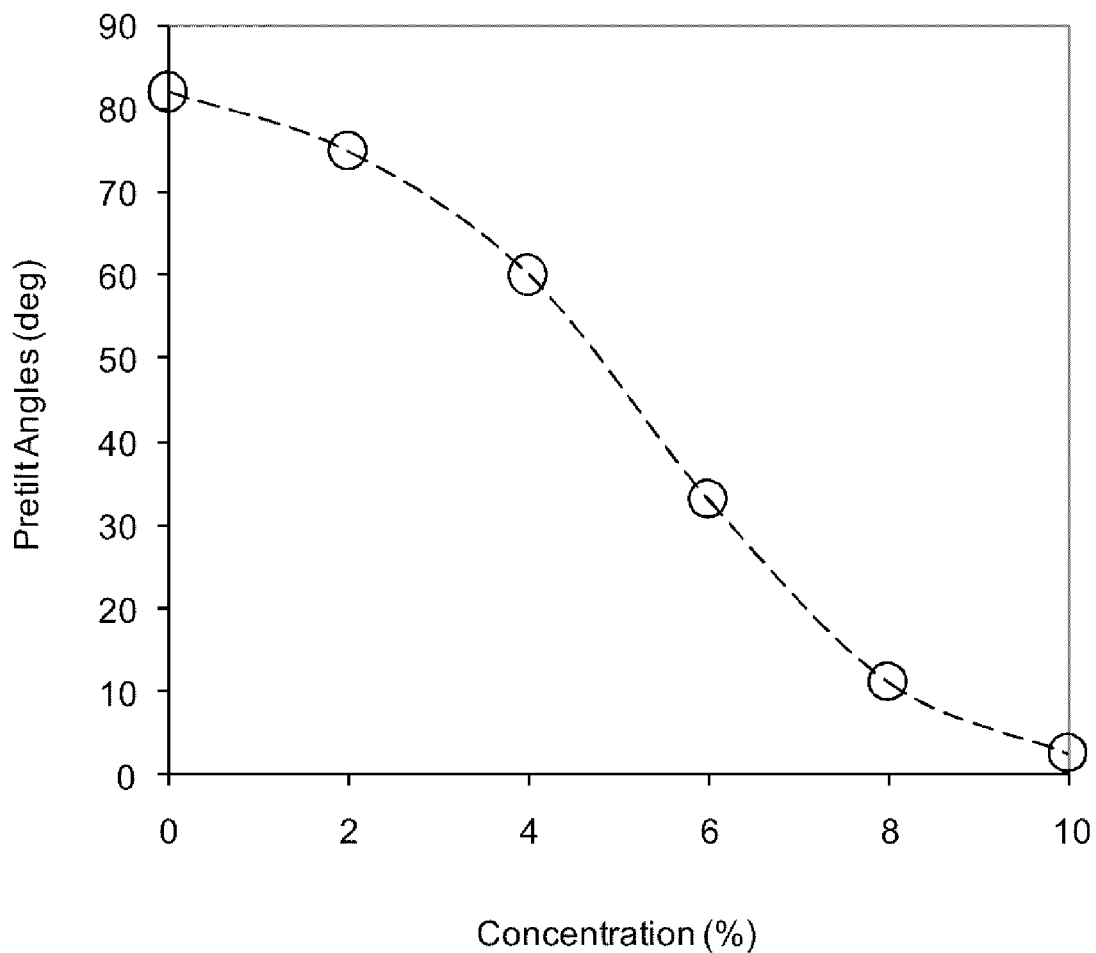
FIG. 27 illustrates results of the pretilt angle generated by the stacked alignment method, where the circular points indicate experimental results.
Figure 28:
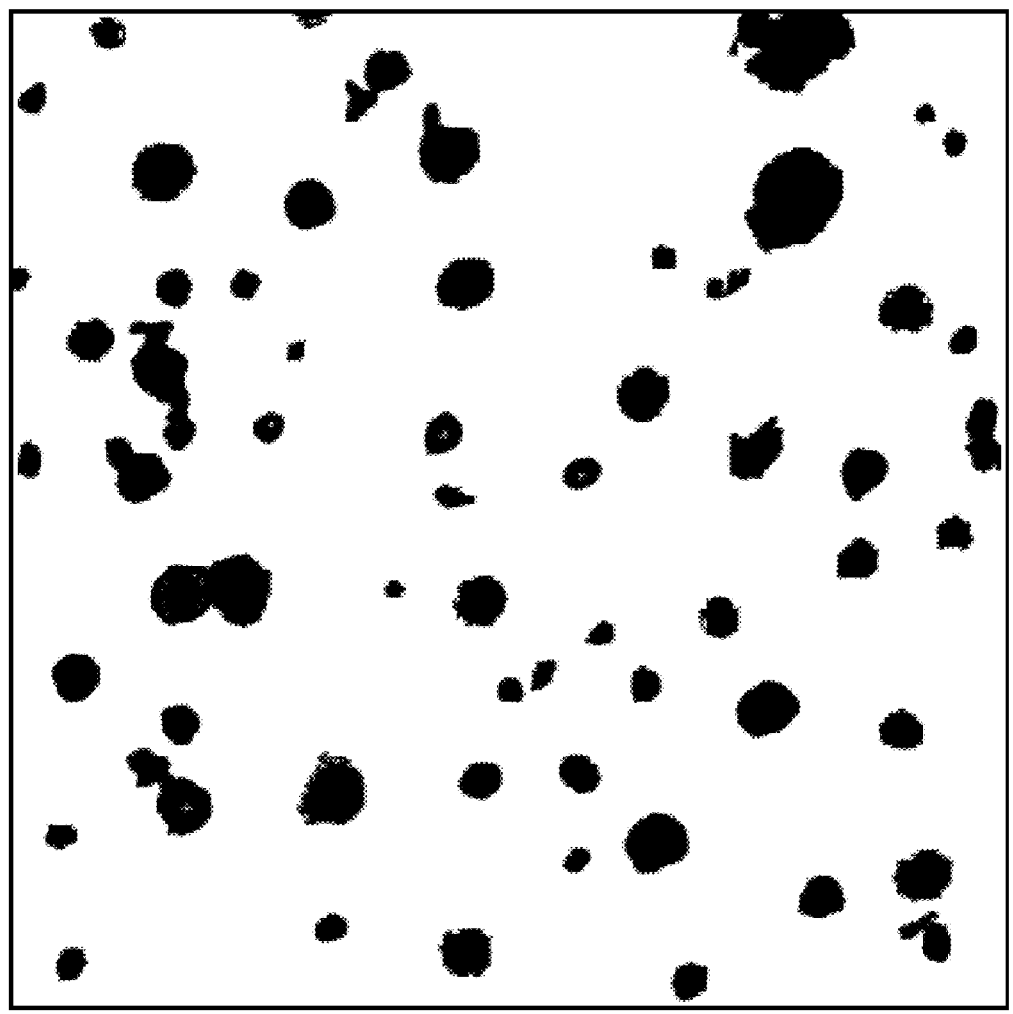
FIG. 28 illustrates a 2% of the ROP-103 induced domain ratio p=11.14%, where white domains indicate vertical alignment domains and black domains indicate horizontal alignment domains.
Figure 29:
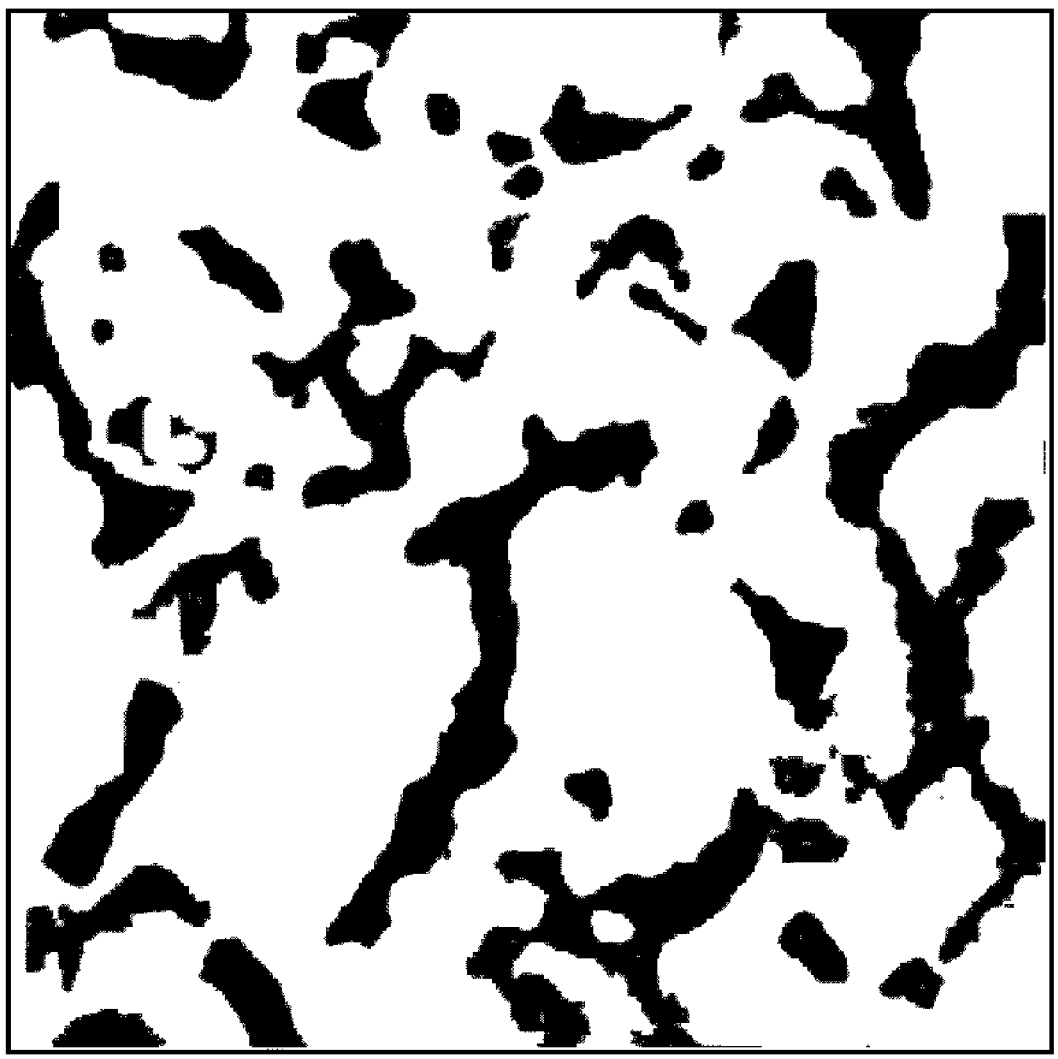
FIG. 29 illustrates a 4% of the ROP-103 induced domain ratio p=25.80%, where white domains indicate vertical alignment domains and black domains indicate horizontal alignment domains.
Figure 30:
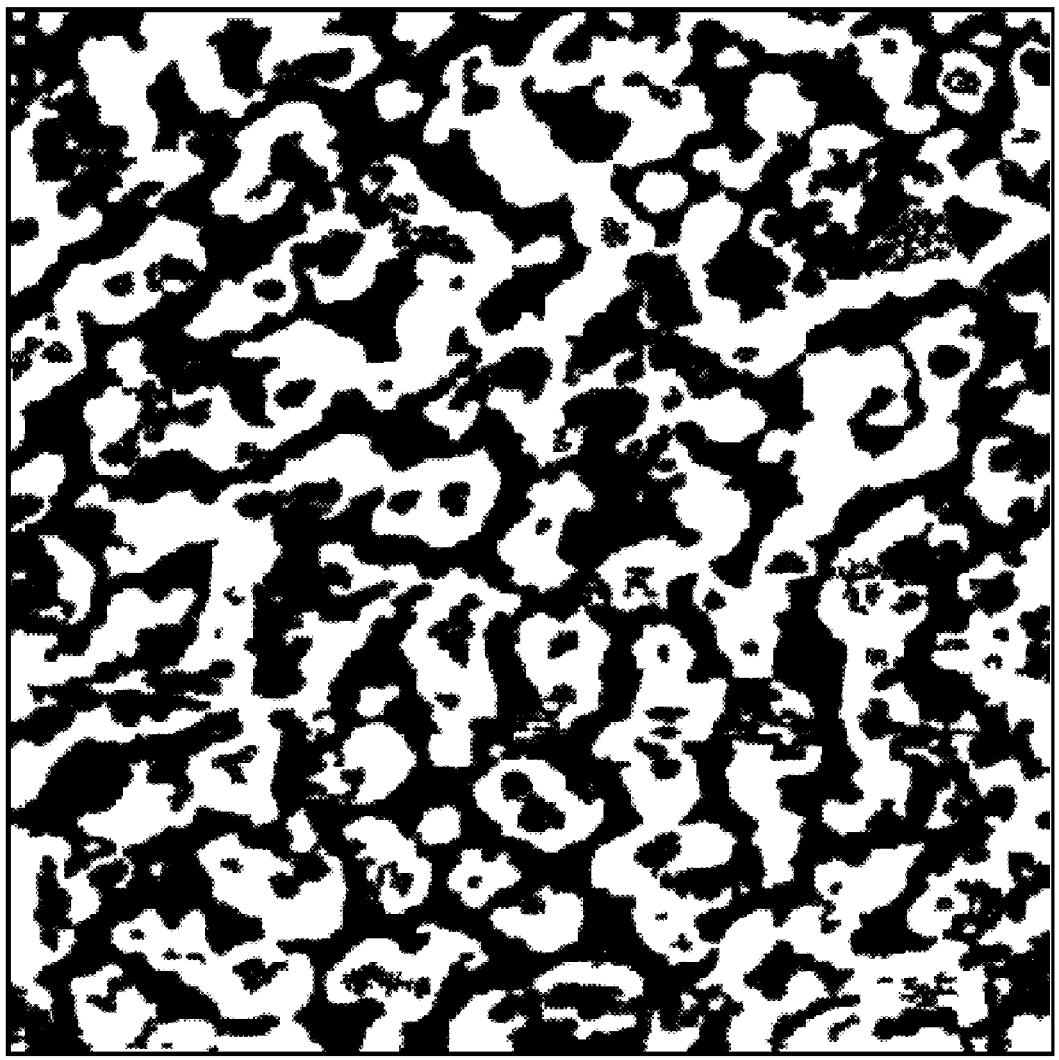
FIG. 30 illustrates a 6% of the ROP-103 induced domain ratio p=56.26%, where white domains indicate vertical alignment domains and black domains indicate horizontal alignment domains.
Figure 31:
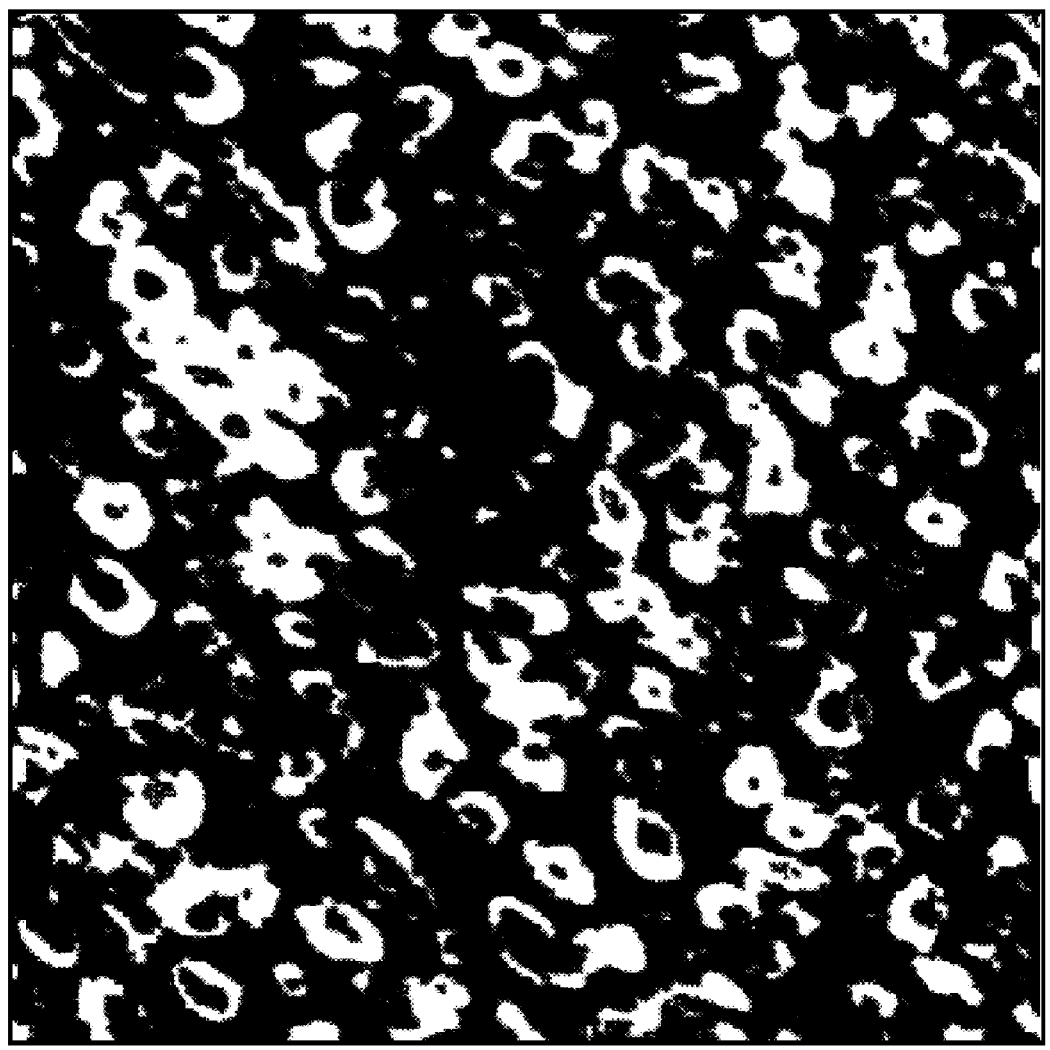
FIG. 31 illustrates an 8% of the ROP-103 induced domain ratio p=78.68%, where white domains indicate vertical alignment domains and black domains indicate horizontal alignment domains.
Figure 32:
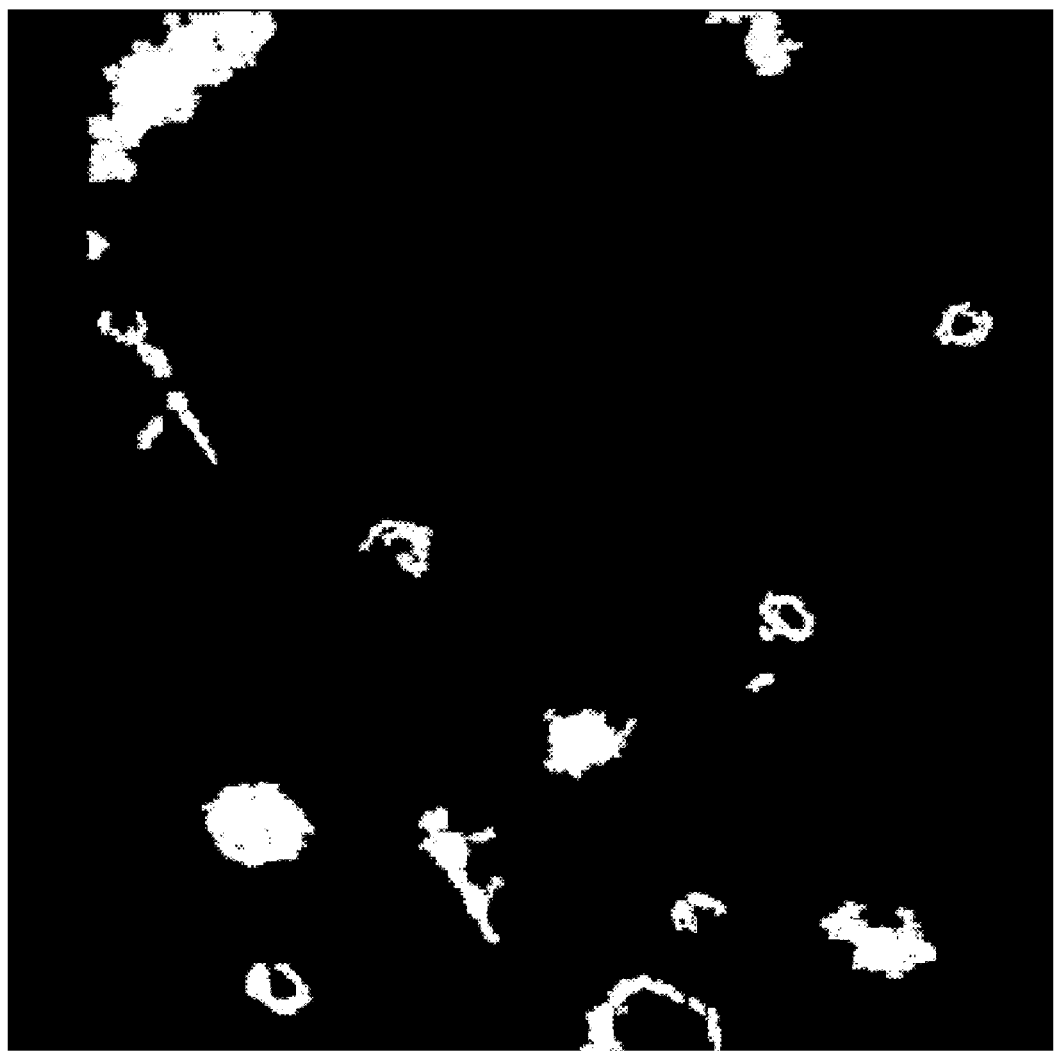
FIG. 32 illustrates a 10% of the ROP-103 induced domain ratio p=95.94%, where white domains indicate vertical alignment domains and black domains indicate horizontal alignment domains.

As shown by the experiments of the sample testing cells, empirically, a higher concentration of the solutions implied a higher ratio p of the horizontal alignment materials in the domains, and thereby a lower pretilt angle can be obtained. Such implication is depicted in FIG. 27. In order to verify the simulation model described earlier, a precise correlation between the concentrations and implied ratio p is obtained.

According to one embodiment, the domain size ratio is calculated and edge detection is applied to each of the atomic force microscope images shown in FIGS. 22-26. Accordingly, the boundaries between the H and V domains are obtained. And their area ratio is equal to the implied ratio p. The results are shown in FIGS. 28-32. Those areas in white color belong to the V domains, whereas the H domains are represented by the black regions.

In the experiments described above, the polar anchoring energy of pure ROP-103 is $1 \times 10^{-3}$ J/m$^2$. The polar anchoring energy is measured by using a high voltage method. According to the atomic force microscopic images in FIGS. 28-32, the actual domain sizes for different domain ratio is actually different. To investigate this difference, an image processing technique is applied.

Figure 33:
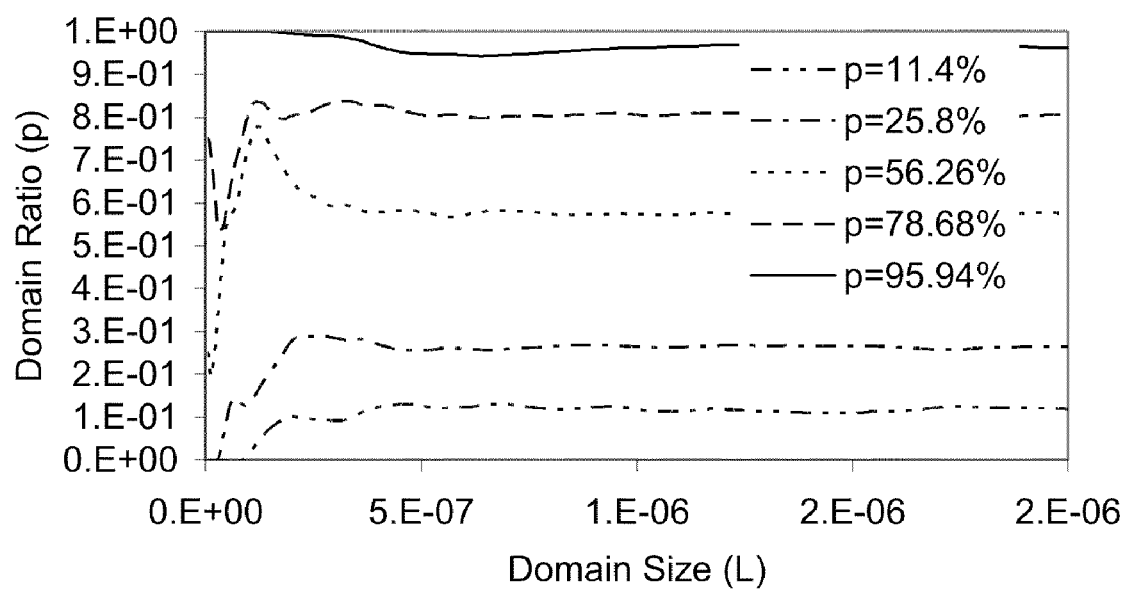
FIG. 33 illustrates the relationship between the domain size (L) and the domain ratio (p) in the atomic force microscopic experimental results.

Different sample domain sizes are applied on the atomic force microscopic images, and the minimum domain size is determined such that the domain ratio becomes a constant value. The experimental results are shown in FIG. 33.

Figure 34:
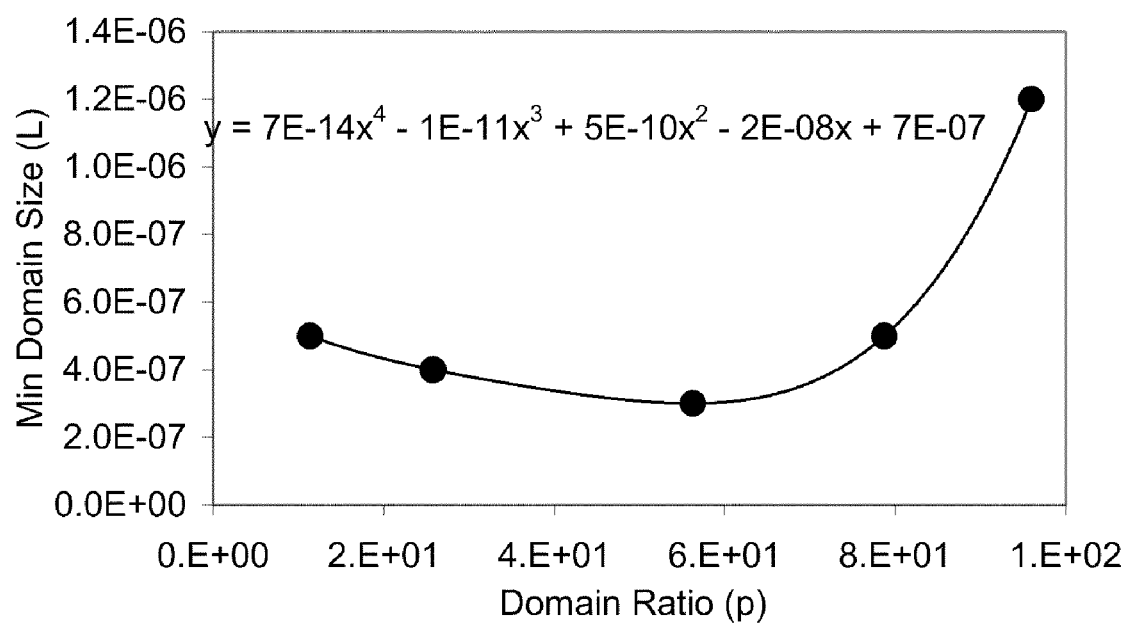
FIG. 34 illustrates the minimum domain size (L) as a function of the domain ratio (p)

FIG. 34, shows the measured domain size vs. the domain ratio p. It can be seen that the average domain size is about 400 nm to 580 nm (all data points are included). Such a domain size is optimal for generating high pretilt angles. It is because the domain size L is not comparable to the extrapolation length due to the surface anchoring, and a non-linear effect can be avoided. Accordingly, the high pretilt angles ranging from 30 to 60 degree can be obtained at large processing windows. Additionally, the ordinary cell gap for the LCD fabrication process is about 4 to 5 μm. The domain size L is on one order smaller than the cell gap. Therefore, the cell gap dependence effect can be ignored as well.

Figure 35:
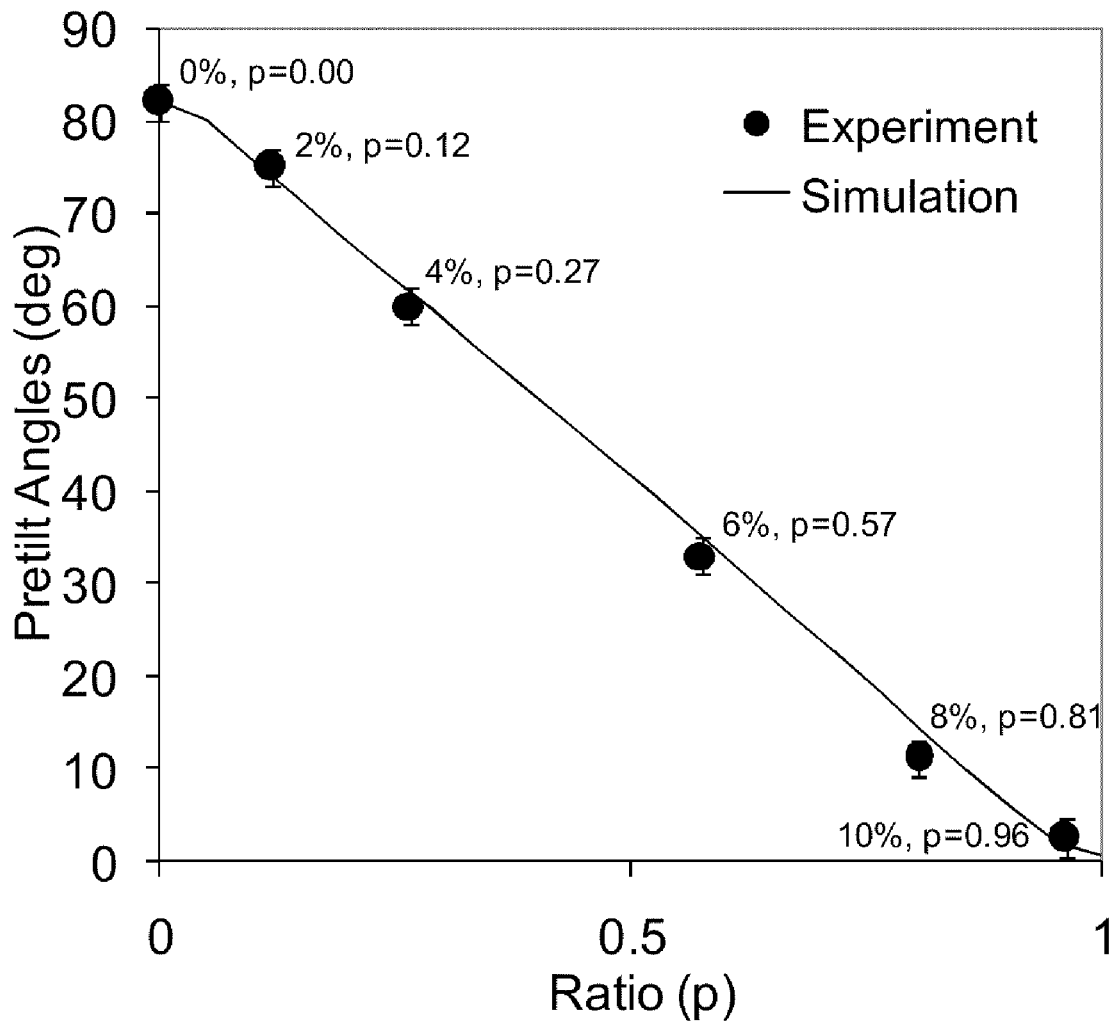
FIG. 35 shows the experimental results of the pretilt angles generated using the stacked alignment method, where the dots indicate the experiments data and the continuous line indicates the simulations result.

After the experimental domain ratio p and the domain size L are obtained, the models discussed earlier are compared with the experimental results. As shown in FIG. 35, the vertical polyimide polar anchoring energy is set at $5 \times 10^{-4}$ J/m$^2$ and the horizontal polyimide polar anchoring energy is set at $1 \times 10^{-3}$ J/m$^2$, the same as that of the ROP-103. FIG. 35 shows that the simulation results substantially agree with the experimental results. The experimental results further show that the non-linear effect can be neglected. It is because the extrapolation length $\ell_e = K/W$ for the V and H domains are not comparable to the domain size L. The pretilt angle varies substantially linearly with the domain ratio p. These results agree with the earlier discussions.

Figure 36:
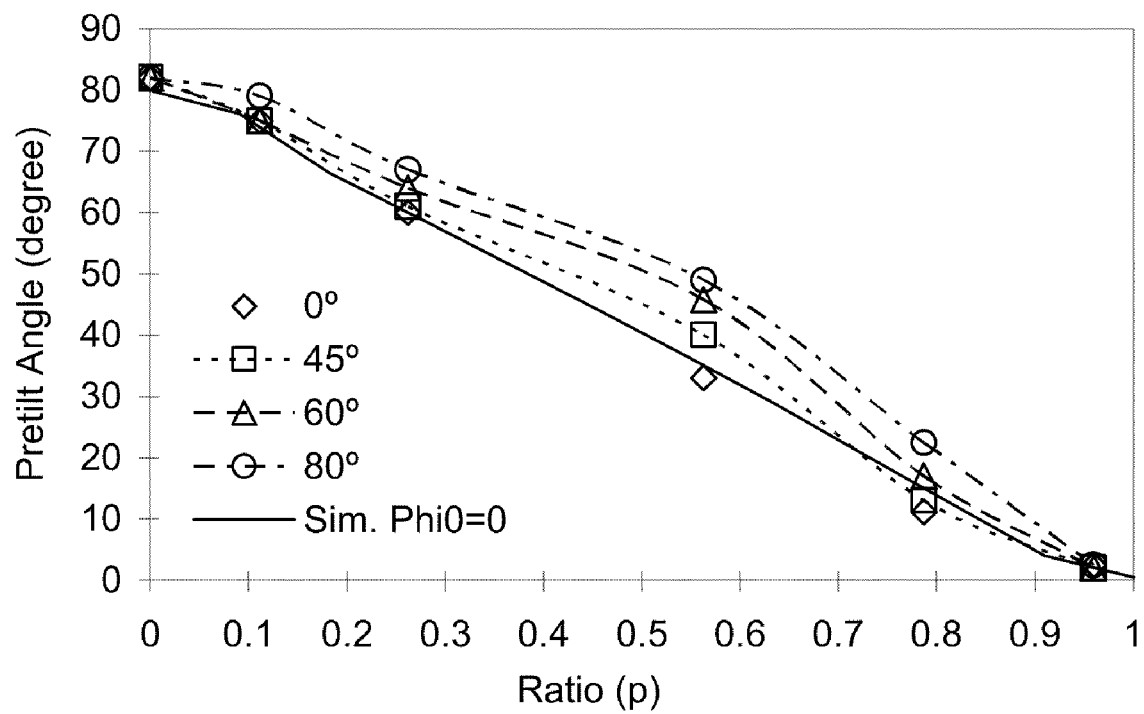
FIG. 36 shows the experimental results of the induced pretilt angles for different fan angles.
Figure 37:
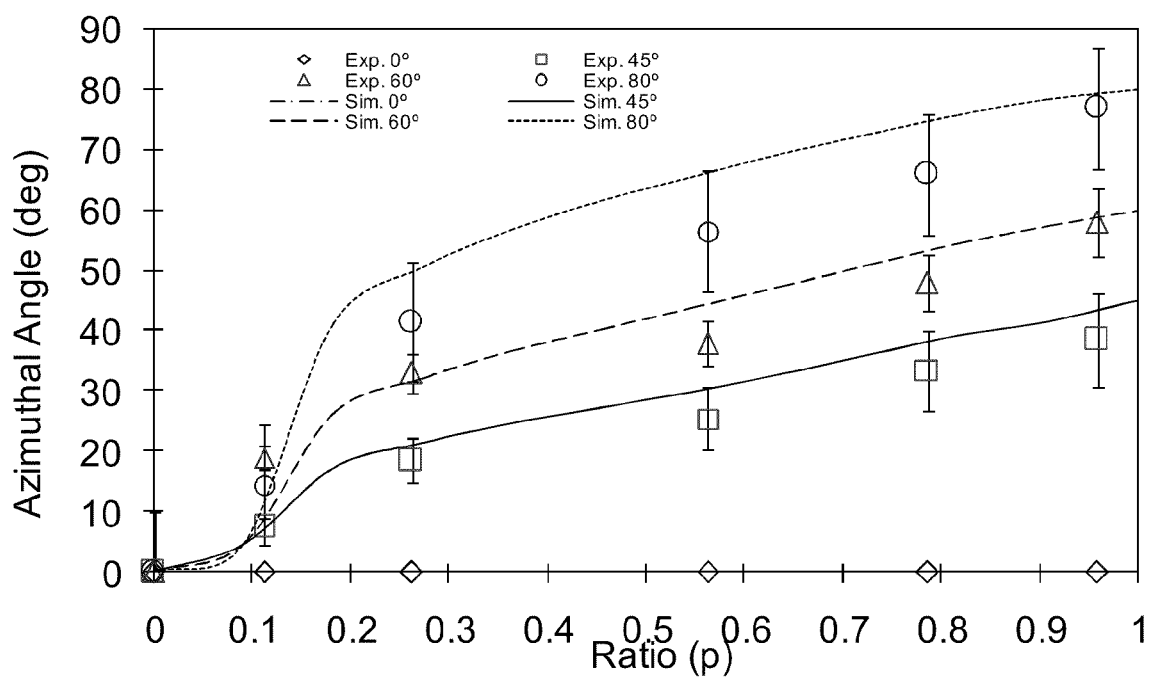
FIG. 37 shows the experimental results of the induced azimuthal angles for different fan angles.

In addition, as shown in FIGS. 36-37, the pretilt angles and the azimuthal angles are measured for different fan angles. The results of the experiments also agree with the simulation results discussed earlier. As shown above, a new method is provided for obtaining arbitrary pretilt angles in liquid crystals.

The preferred embodiments of the present subject matter and a few examples of its versatility are shown and described in the present disclosure. It is to be understood that the present subject matter is capable of use in various other combinations and environments and is susceptible of changes and/or modifications within the scope of the inventive concept as expressed herein. For example, the first layer can also be disposed onto the substrate by an ink jet printing method. Similarly, the second layer can also be disposed onto the first layer by the ink jet printing method. In particular, ink-jet printing technique can modify a thickness of a layer in various parts of the cell by controlling the size or the distribution of the droplets.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A liquid crystal alignment layer in a liquid crystal cell having at least one liquid crystal material, the liquid crystal alignment layer including:
   a substrate;
   a first alignment layer continuously disposed on the substrate for inducing a first liquid crystal pretilt angle and a first azimuth angle in the at least one liquid crystal material at the boundary of the at least one liquid crystal material and the liquid crystal alignment layer; and
   a second alignment layer discontinuously disposed on a surface of the first alignment layer, wherein the second alignment layer independently induces a second liquid crystal pretilt angle and a second azimuth angle in the at least one liquid crystal material at the boundary of the at least one liquid crystal material and the liquid crystal alignment layer;
   wherein the first and second alignment layers are configured to induce substantially uniform pretilt angles and substantially uniform azimuth angles throughout the at least one liquid crystal material away from the boundary of the at least one liquid crystal material and the liquid crystal alignment layer.

2. The liquid crystal alignment layer of claim 1, wherein the second alignment layer includes a plurality of discontinuous island structures.

3. The liquid crystal alignment layer of claim 1, wherein the second alignment layer includes one or more two-dimensional (2D) network structures.

4. The liquid crystal alignment layer of claim 1, wherein the second alignment layer includes hill and valley structures, wherein a height difference between the hill structure and the valley structure ranges from 1 nm to 200 nm.

5. The liquid crystal alignment layer of claim 1, wherein the first alignment layer includes a liquid crystal alignment material selected from one of a polyimide and a photo-alignment materials including azo-dyes and acrylic derivatives.

6. The liquid crystal alignment layer of claim 1, wherein the second alignment layer includes another liquid crystal alignment material selected from one of a polyimide and a photo-alignment materials including azo-dyes and acrylic derivatives.

7. The liquid crystal alignment layer of claim 2, wherein the plurality of island structures are obtained by ink jet printing.

8. The liquid crystal alignment layer of claim 3, wherein the one or more two dimensional network structures are obtained by ink jet printing.

9. The liquid crystal alignment layer of claim 4, wherein the hill and valley structures are obtained by ink jet printing.

10. The liquid crystal alignment layer claim 1, wherein the second alignment layer is disposed on the surface of the first alignment layer by ink jet printing.

11. The liquid crystal alignment layer of claim 2, wherein an average size of the island structures is between 0.1 and 10 micron.

12. The liquid crystal alignment layer of claim 1, wherein liquid crystals of the at least one liquid crystal layer relax from the first and second pretilt and azimuth angles to the substantially uniform pretilt and azimuth angles along an axis that is perpendicular to the boundary of the at least one liquid crystal material and the liquid crystal alignment layer.

13. The liquid crystal alignment layer of claim 12, wherein the portion of the at least one liquid crystal material corresponding to the substantially uniform pretilt and azimuth angles is larger than the portion of the at least one liquid crystal material corresponding to the relaxation of the liquid crystals from the first and second pretilt and azimuth angles to the substantially uniform pretilt and azimuth angles.

14. A method for producing a liquid crystal alignment layer in a liquid crystal cell including at least one liquid crystal material, the method including:
   disposing continuously a first alignment layer on a substrate;
   treating the first alignment layer for inducing a first pretilt angle and a first azimuthal angle in the at least one liquid crystal material at the boundary of the at least one liquid crystal material and the liquid crystal alignment layer;
   disposing discontinuously a second alignment layer on a surface of the first alignment layer; and
   treating the second alignment layer for inducing a second pretilt angle and a second azimuthal angle in the at least one liquid crystal material at the boundary of the at least one liquid crystal material and the liquid crystal alignment layer;
   wherein the induced first pretilt angle and first azimuthal angle and the induced second pretilt angle and second azimuthal angle induce substantially uniform pretilt angles and substantially uniform azimuth angles throughout the at least one liquid crystal material away from the boundary of the at least one liquid crystal material and the liquid crystal alignment layer.

15. The method for producing a liquid crystal alignment layer according to claim 14, further including:
applying a solution onto the substrate;
drying the solution for disposing the alignment layer on the substrate; and
curing the alignment layer.

16. The method for producing a liquid crystal alignment layer according to claim 14, wherein each of the first and the second alignment layers includes at least one alignment material selected from a group of polyimide, azo-dyes, and acrylic derivatives.

17. The method for producing a liquid crystal alignment layer according to claim 14, wherein the second alignment layer includes a plurality of discontinuous island structures.

18. The method for producing a liquid crystal alignment layer according to claim 14, wherein the second alignment layer includes one or more two-dimensional network structures.

19. The method for producing a liquid crystal alignment layer according to claim 14, wherein the second alignment layer includes hill and valley structures.

20. The method for producing a liquid crystal alignment layer according to claim 14, wherein the second alignment layer is disposed on the surface of the first alignment layer by ink jet printing.

21. The method for producing a liquid crystal alignment layer according to claim 19, wherein a height difference between the hill and valley structures ranges from 1 nm to 200 nm.

22. The method for producing a liquid crystal alignment layer according to claim 17, wherein an average size of the island structures is between 0.1 and 10 micron.

23. The method for producing a liquid crystal alignment layer according to claim 14, further comprising mechanically rubbing at least one of the first and the second alignment layers.

24. The method for producing a liquid crystal alignment layer according to claim 14, wherein at least one of the first and the second alignment layers includes a photoalignment material.

* * * * *